(12) United States Patent
Kao et al.

(10) Patent No.: US 10,685,166 B1
(45) Date of Patent: Jun. 16, 2020

(54) METHODS, SYSTEMS, AND COMPUTER PROGRAM PRODUCTS FOR IMPLEMENTING AN ELECTRONIC DESIGN WITH PHYSICAL SIMULATION USING LAYOUT ARTWORK

(71) Applicant: Cadence Design Systems, Inc., San Jose, CA (US)

(72) Inventors: Chun-Teh Kao, Cupertino, CA (US); An-Yu Kuo, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/024,655

(22) Filed: Jun. 29, 2018

(51) Int. Cl.
*G06F 17/50* (2006.01)
*G06F 30/398* (2020.01)
*G03F 1/72* (2012.01)
*G03F 1/36* (2012.01)
*G06F 30/3323* (2020.01)

(52) U.S. Cl.
CPC .............. *G06F 30/398* (2020.01); *G03F 1/36* (2013.01); *G03F 1/72* (2013.01); *G06F 30/3323* (2020.01)

(58) Field of Classification Search
CPC ........ G06F 3/015; G06F 30/367; G06F 30/23; G06F 30/30; G06F 2119/06; G06F 30/18; G06F 3/013; G06F 3/038; G06F 16/90; G06F 16/90335; G06F 1/1626; G06F 1/1686; G06F 2203/0381; G06F 3/017; G06F 3/147; G06F 3/011; G06F 3/012; G06F 3/016; G06F 21/79; G06F 21/86; G06F 2221/2129; G06F 30/00; G06F 15/803; G06F 16/24573; G06F 2111/02; G06F 3/03547; G06F 3/0383; G06F 40/169; A61B 5/0022; A61N 1/36014
USPC ...................................................... 716/50–56
See application file for complete search history.

(56) References Cited

U.S. PATENT DOCUMENTS

| | | | |
|---|---|---|---|
| 8,832,620 B1 * | 9/2014 | Fried ................... | G06F 17/5081 716/110 |
| 9,672,319 B1 | 6/2017 | Cao et al. | |
| 9,785,141 B2 | 10/2017 | Tripathi et al. | |
| 9,864,827 B1 | 1/2018 | Tan et al. | |
| 9,910,947 B1 | 3/2018 | Kao et al. | |
| 10,380,293 B1 | 8/2019 | Liu et al. | |
| 2014/0282328 A1 * | 9/2014 | Fried ................... | G06F 17/5081 716/112 |

(Continued)

OTHER PUBLICATIONS

Ewert, Tony. Advanced TCAD simulations and characterization of semiconductor devices. Diss. Acta Universitatis Upsaliensis, 2006.

(Continued)

*Primary Examiner* — Binh C Tat
(74) *Attorney, Agent, or Firm* — Vista IP Law Group, LLP

(57) ABSTRACT

Various techniques implement an electronic design with physical simulations using layout artwork. The approximate behaviors of the electronic design are determined. A region in the electronic design is identified. A first three-dimensional model is identified, if pre-existing, or generated, if non-existing, for the region in the electronic design. The behaviors of the region is determined using at least physics-based techniques or methodologies that are preconditioned upon at least a portion of the approximate behaviors determined for the electronic design.

20 Claims, 21 Drawing Sheets

(56) References Cited

U.S. PATENT DOCUMENTS

2015/0302132 A1* 10/2015 Zhang ................. G06F 17/5081
716/53

OTHER PUBLICATIONS

You, Donghyun, et al. "Analysis of stability and accuracy of finite-difference schemes on a skewed mesh." Journal of Computational Physics 213.1 (2006): 184-204.
Arnold, Douglas N. "Stability, consistency, and convergence of numerical discretizations." Encyclopedia of Applied and Computational Mathematics (2015): 1358-1364.
Laccarino, Gainluca "ME469A Numerical Methods for Fluid Mechanics" Jan. 19, 2009.

* cited by examiner

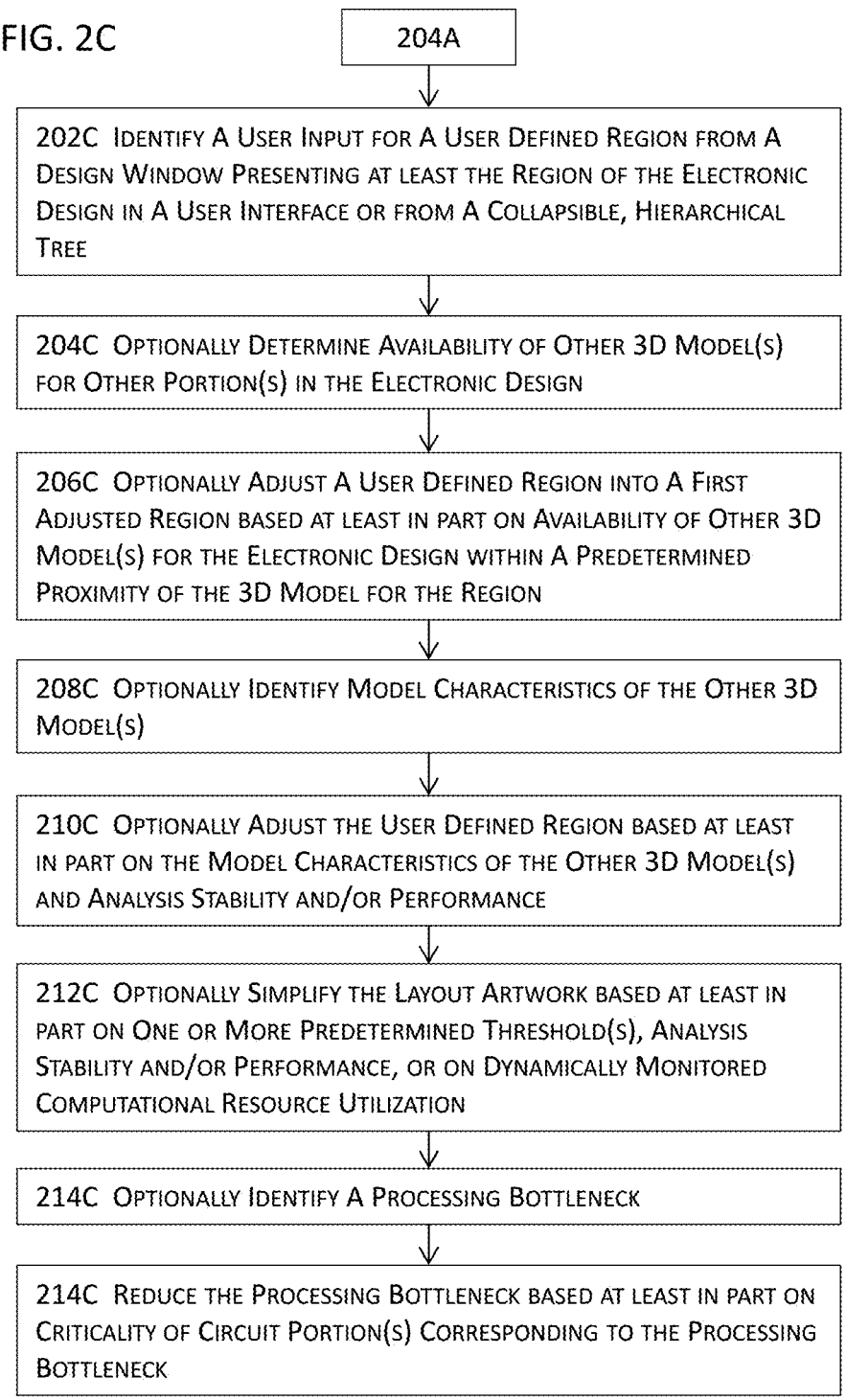

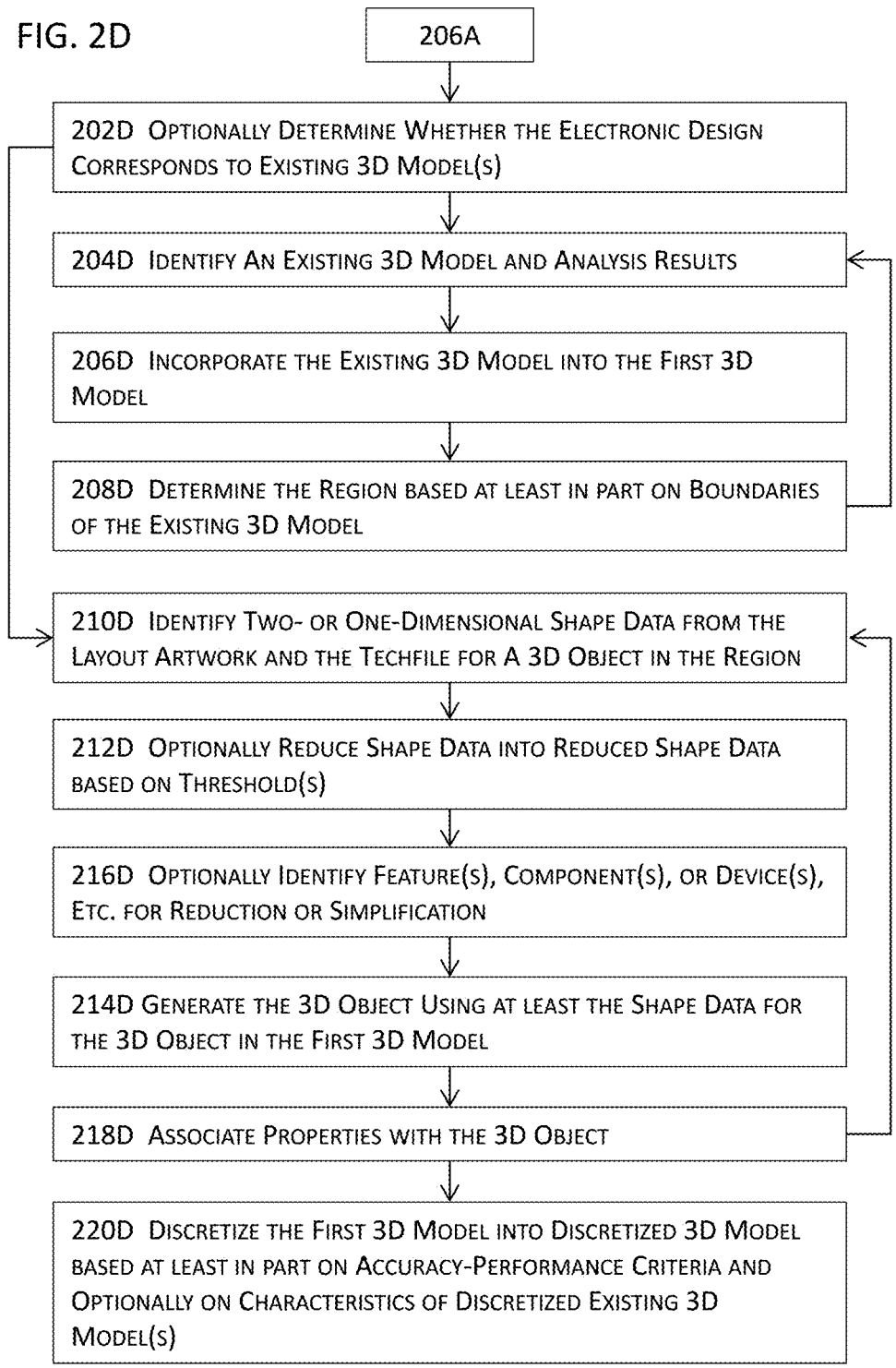

302D

| | Schematic ID | Schematic Symbol | Parent | Schematic Data | ... |
|---|---|---|---|---|---|
| Schematic Component 1 | Sch-ID1 | Sch-Symb1 | Parent 1 | Sch-Data1 | |
| Schematic Component 2 | Sch-ID2 | Sch-Symb2 | Parent 2 | Sch-Data2 | |
| ... | ... | ... | ... | ... | |

| | Layout ID | ... | Parent | Layout Data | ... |
|---|---|---|---|---|---|
| Layout Component 1 | Layout-ID1 | ... | Parent 1 | Data1 | |
| Layout Component 2 | Layout-ID2 | ... | Parent 2 | Data2 | |
| ... | ... | ... | ... | ... | |

METHODS, SYSTEMS, AND COMPUTER PROGRAM PRODUCTS FOR IMPLEMENTING AN ELECTRONIC DESIGN WITH PHYSICAL SIMULATION USING LAYOUT ARTWORK

BACKGROUND

The recent advances in very deep sub-micron (VDSM) integrated circuits (ICs) have brought new challenges in the electronic design methodologies. In modern electronic circuits, the total number of transistors has increased; geometries have become smaller; and clock frequencies have increased over time. Errors on silicon have become prohibitively expensive. To address the ever increasing total number of transistors and clock frequencies, three-dimensional (3D) integrated circuits (3D-ICs), die-stacking, and non-planar transistors such as Fin Field Effect Transistor (FinFET) have been developed.

Nonetheless, such 3D-ICs, die-stacking, and non-planar transistors intrinsically cause thermal issues and electromagnetic issues due to, for example, the lack of readily accessible thermal dissipation channel, when compared with a single chip in a package on a printed circuit board (PCB). Through costly experiments and mistakes, thermal vias and perhaps through silicon vias (TSVs) are developed to counter the thermal issues. As a result, there has been a long-felt need for pre-silicon analysis capabilities using the data in the layout artwork.

Some conventional approaches attempt to tackle such needs by modeling electronic circuits with layout artwork. Such conventional approaches are nevertheless limited by the size of layout artwork for modern electronic designs. For example, a GDSII file for a modern semiconductor chip may easily occupy hundreds of gigabytes, terabytes, or even larger space on disk. To further exacerbate these challenges and problems, such humongous sizes of modern layout artwork are merely the sizes of the corresponding layout artwork, and an actual model representing an entire semiconductor chip may be even larger to fit into the memory of even the most powerful computing systems, not to mention performing any analyses with such a model.

As a result, conventional approaches try to avoid such insurmountable obstacles by simply modeling a circuit component, such as a FinFET or a small cell or block. During analyses with a model for such a small, discrete component that is not tied to any other circuit components as in real world applications, the analysis results would be educated guess at best yet provide limited information or insight, if any, to help designers understand how the modeled circuit component would behave in real world applications.

Similarly, modern electronic designs are more sensitive to electromagnetic interferences. Even for planar circuit features, modern electronic designs often have a large number of layers stacking on top of each other. On the other hand, conventional electromagnetic analyses adopt pseudo-3D (also known as 2.5D, or three-quarter perspective) methodologies. The analysis results thus require certain empirical or a posteriori corrections or modifications to approximate what actually occurs in a real, multi-layer electronic circuit. These conventional electromagnetic analyses have encountered greater difficulties in determining the behaviors of 3D-ICs or electronic designs having non-planar transistors or may simply reduce such 3D-ICs or non-planar circuit components to a simplified form to fit their analysis capabilities and thus lose resolution and details of the behaviors of such non-planar circuit features.

Therefore, it is important for an EDA tool to efficiently, effectively, and accurately implement electronic designs with physical simulations using layout artwork to address at least the aforementioned shortcomings of conventional approaches.

SUMMARY

Disclosed are method(s), system(s), and article(s) of manufacture for implementing an electronic design with physical simulation using layout artwork in one or more embodiments. Some embodiments are directed at a method for implementing an electronic design with physical simulation using layout artwork. In these embodiments, the approximate behaviors of the electronic design are determined. A region in the electronic design is identified. A first three-dimensional model is identified, if pre-existing, or generated, if non-existing, for the region in the electronic design. The behaviors of the region is determined using at least physics-based techniques or methodologies that are preconditioned upon at least a portion of the approximate behaviors determined for the electronic design.

In some of these embodiments, the one or more layout analysis modules reduce or eliminate mask manufacturing cycle time or mask manufacturing errors based in part or in whole upon the behaviors of the region, wherein the electronic design comprises at least one of a semiconductor chip, an integrated circuit (IC) package for the semiconductor chip, a printed circuit board having at least the IC package mounted thereupon, a computing system comprising the printed circuit board, a rack including the computing system and one or more additional computing systems, and a plurality of racks each including the computing system and the one or more additional computing systems.

In addition or in the alternative, the one or more layout analysis modules are configured to identify a model generation module from a plurality of model generation modules each corresponding to a respectively granularity or resolution level of details and determine at least one pertinent portion of the layout artwork for generating a reduced 3D model for the electronic design. In some of the aforementioned embodiments, the one or more layout analysis modules identify geometric data from the layout artwork or one or more technology files, identify one or more properties of one or more materials that are used for one or more circuit components in the electronic design; and generate the reduced 3D model for the electronic design using at least the model generation module with the geometric data from the layout artwork or the one or more technology files.

Moreover, a custom selection of one or more circuit features, components, or devices or one or more granularity or resolution levels may be identified. In some embodiments, a granularity or resolution level or a first hierarchical level in the electronic design may be identified for the reduced 3D model for the electronic design; the one or more layout analysis modules identify a plurality of first geometric characteristics of the electronic design based at the granularity or resolution level or the first hierarchical level and determine the reduced 3D model for the electronic design using at least the plurality of first geometric characteristics.

In addition, the one or more layout analysis modules identify one or more material properties for one or more first circuit features, circuit components, or devices in one or more lower hierarchical levels below the first hierarchical level or the granularity or resolution level, identify a plurality of second geometric characteristics for the one or more first circuit features, circuit components, or devices in the one or more lower hierarchical levels below the first hierarchical level or the granularity or resolution level, and distribute the one or more material properties in or on the reduced 3D model based at least in part upon the plurality of second geometric characteristics.

In some embodiments, the region may be identified from a design window presenting at least the region of the electronic design in a user interface or from a tree structure presenting a list of circuit component designs in the electronic design in the user interface. In addition, the one or more layout analysis modules may optionally determine availability or presence of one or more other 3D models for one or more portions in the electronic design. The one or more layout analysis modules may optionally adjust the region into a first adjusted region based at least in part upon the availability or the presence of the one or more other 3D models and a proximity requirement in relation to the region.

The one or more layout analysis modules may optionally identify one or more model characteristics of the one or more other 3D models, or optionally adjust the region or the first adjusted region into a second adjusted region based in part or in whole upon one or more first criteria, the one or more criteria comprising the one or more model characteristics of the one or more other 3D models, an analysis stability requirement, or a performance requirement.

The one or more layout analysis modules may also optionally simplify or reducing the layout artwork based at least in part upon one or more second criteria, the one or more second criteria comprising one or more predetermined thresholds, the analysis stability requirement, the performance requirement, or computational resource utilization information, optionally identify or predict one or more processing bottlenecks, or in response to an identification or a prediction of a processing bottleneck, optionally reduce or eliminate the processing bottleneck at least by altering a processing requirement based at least in part upon criticality of one or more circuit portions corresponding to the processing bottleneck.

In some embodiments, the one or more layout analysis modules may determine whether the electronic design corresponds to one or more existing 3D models and identify an existing 3D model from the one or more existing 3D models, in response to results of determining whether the electronic design corresponds to the one or more existing 3D models. In these embodiments, the one or more layout analysis modules may incorporate the existing 3D model into the first 3D model based in part or in whole upon a relative position of the existing 3D model relative to the region, and determine a final size, shape, or location of the region based at least in part upon boundaries of the existing 3D model.

In some embodiments, the one or more layout analysis modules that identify or generate the first 3D model may identify one- or two-dimensional shape data from the layout artwork or one or more corresponding technology files for a 3D object in the region, and generate the 3D object using at least the one- or two-dimensional shape data for the 3D object in the first 3D model.

In some of these embodiments, the one or more layout analysis modules may further identify one or more properties of one or more materials used for circuit components in the region of the electronic design, associate the one or more properties with the 3D object in the first 3D model for the region, and discretize the first 3D model into a discretized 3D model based at least in part upon one or more first factors, the one or more first factors comprising a performance requirement, an accuracy requirement, a sliding balance requirement between performance and accuracy, or one or more first model characteristics of one or more existing 3D models for the electronic design.

In some embodiments, the one or more layout analysis modules that determine the behaviors of the region may identify corresponding approximate behaviors for the region or a portion of the region from the approximate behaviors of the electronic design, transform the corresponding approximate behaviors into corresponding constraints or conditions for the first 3D model, impose the corresponding constraints or conditions on one or more corresponding portions of the first 3D model using at least one or more indexed data structures, and generate analysis results for the first 3D model at least by determining the behaviors of the region with the corresponding constraints or conditions with the one or more physics-based techniques or methodologies.

In some of the aforementioned embodiments, the analysis results may be presented with graphical or textual emphasis on and one or more links to abnormal behaviors in the behaviors and one or more corresponding circuit portions in the region in the user interface; one or more modifications may be implemented in the one or more corresponding circuit portions in the region based at least in part upon the abnormal behaviors; and the one or more layout analysis modules may re-validate the behaviors of at least the one or more corresponding circuit portions.

In addition or in the alternative, the one or more layout analysis modules re-use at least a part of the analysis results in an area of the electronic design, wherein the area of the electronic design is outside of a range of influence of the abnormal behaviors and update one or more indices of the one or more indexed data structures based at least in part upon information about the one or more modifications.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 2B-2E respectively illustrate more detailed block diagrams for the block diagram for implementing an electronic design with physical simulation using layout artwork illustrated in FIG. 2A in some embodiments.

FIGS. 3D-3E jointly illustrate some examples of one or more indexed data structures in some embodiments.

DETAILED DESCRIPTION

Figure 1:
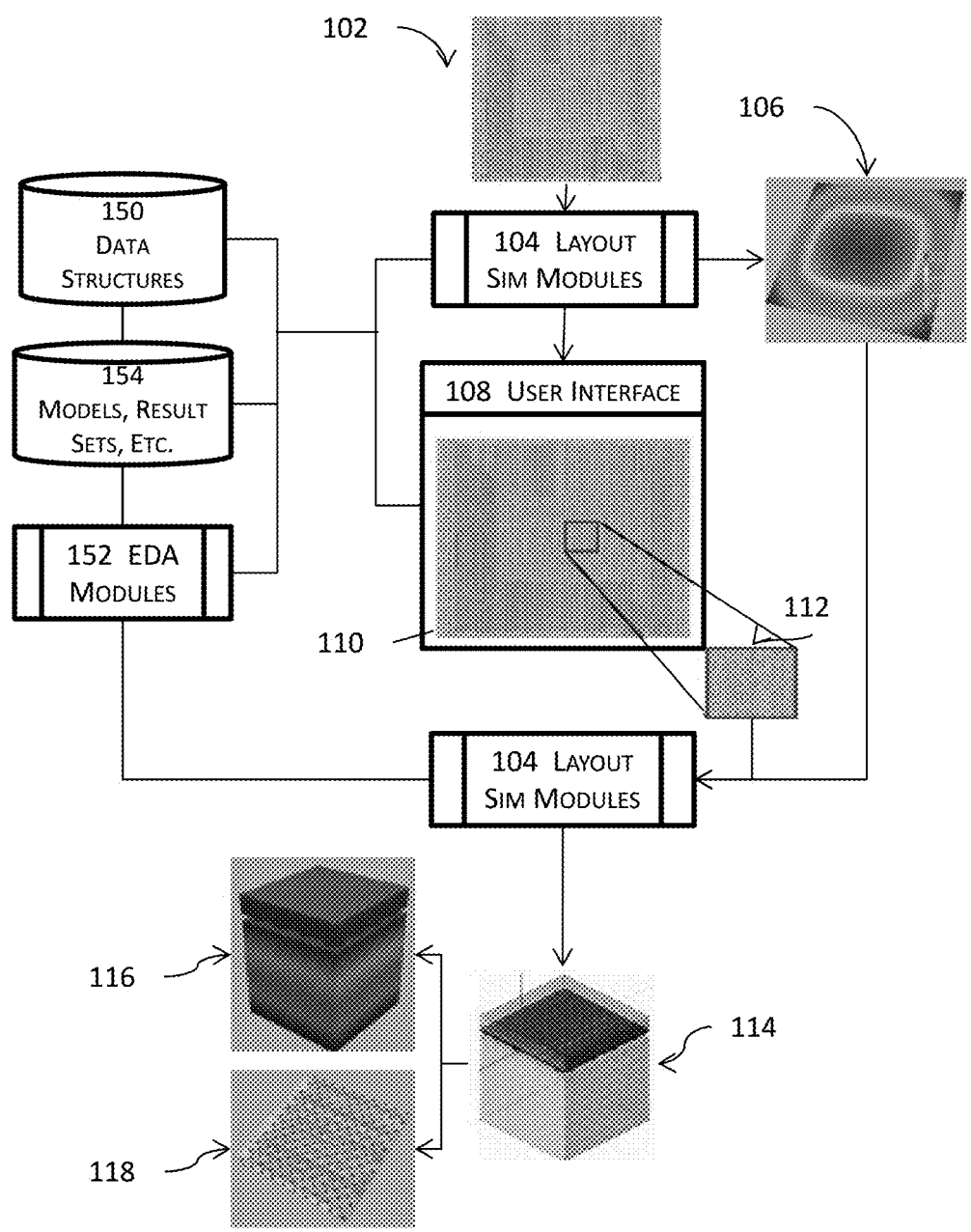
FIG. 1 illustrates a high level block diagram of a hardware system for implementing an electronic design with physical simulation using layout artwork in one or more embodiments.

Various embodiments of the invention are directed to methods, systems, and articles of manufacture for implementing an electronic design with physical simulation using layout artwork. Other objects, features, and advantages of the invention are described in the detailed description, figures, and claims.

In some embodiments, the techniques described herein perform one or more physical simulation for an electronic design with layout artwork of the electronic design to determine the behaviors for the entire electronic design. At this stage, the electronic design is modeled using the layout artwork such as the data in, for example, GDSII stream format (Graphic Database System), OASIS (Open Artwork System Interchange Standard by SEMI or Semiconductor Equipment and Materials International) data file, or any other suitable formats (e.g., Caltech Intermediate Form, Milkyway, DEF or Design Exchange Format, OpenAccess, etc.) for data exchange for electronic designs among participants in the design and manufacture of electronic designs such as semiconductor fabrication foundries, electronic design automation (EDA) tool providers, designers, etc. It shall be noted that the specific mention of one particular layout artwork format in the present disclosure is not intended to limit and shall not be interpreted to limit the scope of the present disclosure to that particular layout artwork format, unless otherwise specifically recited in the claims.

The model of the entire electronic design may be reduced or simplified in some embodiments when the computing system is limited by its computational capacity in handling great disparity between the macroscopic level of features (e.g., the rack level, system level, printed circuit board level, etc.) and the microscopic level of features (e.g., IC or integrated circuit package level, cell level, or even finer granularity levels such as transistor level, etc.), especially considering the ever increasing transistor counts (e.g., in the order of billions in modern ICs) and clock frequencies (e.g., in the order of tens of Gigahertz or even higher frequencies). It is appreciated that these techniques described herein may model the entire electronic design with the layout artwork when the computing system possesses sufficient computational capacity to handle such electronic designs.

In these embodiments where the model of an entire electronic design is generated using certain reduction or simplification techniques, the determined behaviors represent approximate behaviors of the electronic design due to the loss of resolution in the reduction or simplification techniques in the model. Although such approximate behaviors (e.g., electrical behaviors, convective and/or conductive static or thermal behaviors) may provide a certain degree of accuracy or may even provide satisfactorily accurate predictions of behaviors of interest, a simplified or reduced model of the entire electronic design simply does not provide sufficient resolution for a designer to obtain the specific behaviors of certain devices having sufficiently small sizes.

For example, a reduced model of a printed circuit board having a plurality of semiconductor chips may not provide sufficient resolution to delineate the thermal behaviors (e.g., self-heating, reliability, electromigration, or any other heat-related behaviors) of a FinFET (Fin Field Effect Transistor or a non-planar transistor) or a 3D-IC (three-dimensional integrated circuit) because the sizes of the features of a FinFET, is much smaller than the macroscopic scale of the semiconductor chip containing the FinFET, not to mention the printed circuit board and are thus reduced or simplified in the construction of the reduced model of the entire electronic design (the printed circuit board in this example).

In these embodiments with reduced or simplified model for an entire electronic design, a region may be identified and further analyses to determine more precise behaviors of the identified region in some embodiments. For example, a designer may use a pointing device to identify a region of interest in the layout window. These techniques described herein may then retrieve the fine geometric details from the layout artwork (e.g., GDSII data) and construct a more detailed 3D model for the region. This 3D model may theoretically include all the design details of the devices in the region although certain non-critical portions (e.g., a portion of the fiberglass reinforced epoxy substrate of the PCB with no circuitry therein) may also be reduced into one or more monolithic blocks that are further integrated into the 3D model of the region.

In these embodiments, the portion of the approximate behaviors previously determined for the entire electronic design may be used as constraints or conditions (e.g., boundary conditions, initial conditions, etc.) that may be further imposed upon the aforementioned 3D model for the region. With these imposed conditions, this 3D model may be analyzed with one or more physics-based analysis techniques or methodologies. For example, these techniques described herein may discretize the 3D model into a set of elements or meshes and a corresponding set of nodes and analyze the 3D model with, for example, the finite element method using the imposed conditions from the corresponding approximate behaviors of the entire electronic design. Because this 3D model for the region may theoretically include all the design details, the analysis results thus provide a configurable or user selectable level of granularity and resolution from the macroscopic level (e.g., the system level, the PCB level) down to the Nano-scale (e.g., individual features of a FinFET) so that various behaviors of the devices in the identified region may be accurately determined.

With these techniques, an entire electronic system (e.g., one or more racks of servers, a computing system, etc.) can be efficiently analyzed without compromising the accuracy of the analysis results, even with today's computing systems with limited computational capacity that is not even sufficient to analyze a semiconductor chip using layout artwork. For example, these techniques may determine the approximate behaviors of a macroscopic electronic design and then partition the macroscopic electronic design into multiple regions. Each of these regions may be analyzed in a variety of different ways (e.g., via distributed computing, parallel processing, etc.) The predicted behaviors of a region may then be represented as a set of one or more nodes that are interconnected according to its detailed designs. These sets of nodes respectively representing these multiple regions may then be assembled into a network. Because each set of nodes corresponds to the analysis results obtained from physics-based analyses techniques or methodologies using layout artwork, the network, once assembled or even solved if necessary, may then provide an accurate representation of the behaviors of the entire electronic design.

One of the advantages of these techniques described herein is that unlike conventional approaches, these techniques enable physics-based analyses of an entire electronic design using layout artwork even on modern computer systems having limited computational capacity. Another advantage is that these techniques provide detailed behaviors of an electronic design or at least a portion thereof at the full spectrum of granularities and resolutions—from macroscopic to microscopic to Nano-scale. Conventional approaches simply lack the capability to provide any solutions to cover such a full spectrum.

Another advantage is that these techniques do not use brute-force approaches to obtain the desired solutions, although these techniques are equally capable of employing such brute-force approaches as any other approaches. In addition to allowing a user to select a user-defined region from an electronic design for analysis, these techniques also allow a user to select a custom set of components for detailed modeling or reduced or simplified modeling. For example, in the reduced or simplified modeling and construction of the model for an entire electronic design, a user may select one or more features, components, or devices for detailed modeling in some embodiments. During the detailed modeling of a user-defined region, a user may also dynamically or on-the-fly identify one or more features, components, or devices for reduced or simplified modeling in some embodiments. For example, these techniques may examine the devices in a user-defined region in advance and predict one or more bottlenecks that may occur during the generation of a detailed model for the region and provide an option to a user to model the corresponding portions of the region as one or more reduced or simplified sub-models in some embodiments. As another example, these techniques may also monitor the progress of the generation of a detailed model of a user-defined region and dynamically identify a bottleneck that may consume more than a threshold amount of computational resources for the generation of the detail model or for subsequent analyses. In the aforementioned example, these techniques may present the features, components, or devices that correspond to the predicted allow the user to select the features, components, or devices for reduced or simplified modeling, rather than detailed modeling to eliminate or at least reduce the impact of the bottleneck on, for example, runtime, memory usage, etc.

Yet another advantage of these techniques is that these techniques may generate one or more indexed data structures (e.g., one or more indexed database tables) or update one or more existing data structures with indices (e.g., unique and/or non-unique database keys) to store various pieces of data including, for example, techfile, schematic data, layout data, layout artwork, etc. The one or more indexed data structures may be indexed with unique and/or non-unique database keys that may be further sorted to facilitate expedient and efficient identification and retrieval of and access to any data related to an electronic design of interest. In these embodiments, the one or more indexed data structures may be further linked by a set of link structures (e.g., pointers, references, links, symbolic links, etc.) so that for any given feature, component, or device at a specific abstraction, these techniques may expediently and efficiently identify the corresponding data in other abstractions using the aforementioned indices and/or the set of link structures.

For example, when a specific feature (e.g., a FinFET) that has been or is being constructed from the layout artwork for a detailed model of a user-defined region is identified, and the corresponding layout data (or the schematic data) is to be identified for this specific feature, these techniques may identify the matching layout shape(s) or instance in the layout database using the set of link structures and may further query the one or more indexed data structures (or the layout database) using the aforementioned indices to identify the data of the layout shape(s) or instance that corresponds to the specific feature, without having to traverse or parse the layout database (or the one or more indexed data structures) to identify the desired layout data.

Similarly, these techniques may also use the set of link structures to identify the schematic instance or components that correspond to the specific feature (or the corresponding layout shape(s)). The corresponding schematic data may also be similarly identified from the schematic database (or the one or more indexed data structures) by using the aforementioned indices to expediently and efficiently identify the correspond schematic data, without having to traverse or parse the schematic database (or the one or more indexed data structures) to identify the desired schematic data.

Yet another advantage of some techniques described herein is that these techniques leverage one or more indexed data structures and one or more link structures to associated 3D models, meshes and nodes in 3D models, layout artwork, technology files, schematic database, and layout database directly or indirectly with each other. With these one or more indexed data structures and one or more link structures, boundary conditions and initial conditions can be precisely applied to the correct circuit components or their corresponding locations in 3D models for analyses, regardless of whether the circuit components are actually modeled in the 3D models. For example, a certain power is to be supplied to a specific Vcc pin in operation. In a detailed 3D model including the 3D object of the specific Vcc pin according to the schematic design, the certain power may be applied to this 3D object by identifying the schematic component name for the Vcc pin that can be directly correlated with the 3D object in the 3D model via one or more indexed data structures including the correspondence relation between the schematic component and the specific 3D object or can be indirectly correlated with the 3D object in the 3D model via, for example, the corresponding layout shape in the layout database. In some other embodiments having a reduced 3D model that does not include a specific 3D model for the Vcc pin, the certain power may also be applied to this 3D model at the node that corresponds to the location of the Vcc pin by referencing, for example, the layout data or the layout artwork.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram of a system for implementing an electronic design with physical simulation using layout artwork in one or more embodiments. In these one or more embodiments, FIG. 1 illustrates a high level block diagram of a hardware system and may comprise one or more computing systems, such as one or more general purpose computers described in the System Architecture Overview section, to implement various intended functions and to achieve desired results.

In some embodiments, the one or more computing systems may include or, either directly or indirectly through the various resources or modules 152, invoke a set of modules including hardware and software modules or combinations of one or more hardware and one or more software modules that are stored at least partially in computer memory. In operation, the one or more computing systems may invoke one or more layout simulation or analysis modules 104 that receive an entire electronic design 102, generate a reduced or simplified model for the entire electronic design 102, and perform one or more analyses to determine approximate behaviors 106 of the entire electronic design 102. The electronic design 102 referenced in FIG. 1 and elsewhere in this application may constitute designs of, for example, multiple racks of computing systems, a computing system, a printed circuit board having fully integrated and functioning circuit components, one or more packages of a semiconductor chip, or one or more semiconductor chips, etc.

With the approximate behaviors 106 determined, the one or more systems may identify a region of interest 112 either via partitioning the entire electronic design 102 into a plurality of partitions and identifying a partition therefrom or via a user input (e.g., a user-defined region of interest received from a user interface). This region of interest 112 may be provided to the one or more layout simulation or analysis modules 104 to perform detailed modeling that generates a detailed model (114) from the layout artwork for the region.

This detailed model may be further analyzed using physics-based techniques or methodologies to determine more detailed analysis results. Because this detailed model 114 may be constructed using corresponding data in the layout artwork (for geometric or location information) and a techfile (e.g., for thickness information, material properties, etc.), the physics-based analyses based on this detailed model thus provide full range of resolution for the behaviors of the region. For example, the analysis results may include distribution or profile of the behaviors (116) over the detailed model (114) of the region (112) or the distribution or profile of the behaviors (118) of one or more layers (or even finer granularity levels) that are included in the detailed model (114) of the region (112).

The analysis results (116 and/or 118) may be stored in the one or more local or remote non-transitory computer accessible storages (154) for subsequent reuse to represent the region of interest (112) in the same electronic design (110) or in different electronic designs (not shown) containing exactly or approximately the same region of interest.

In some embodiments, the one or more computing systems may invoke various system resources such as the processor(s) or processor core(s), memory, disks, etc. The one or more computing systems may also initiate or interact with other computing systems to access, via a computer bus architecture (e.g., a system bus, a control bus, a data bus, or any combinations thereof), various resources and EDA (electronic design automation) modules 152 that may comprise, for example, a schematic editor, a floorplanner, a global routing engine, and/or a detail routing engine, a layout editor, a design rule checker, a verification engine, post-layout optimizers (e.g., OPC or optical proximity correction modules, phase shift mask or PSM tools, resolution enhancement technology or RET tools, computational lithography tools, etc.)

The one or more computing systems may further write to and read from one or more local or remote non-transitory computer accessible storages that store thereupon data or information such as, but not limited to, techfiles, one or more data structures (150) such as the aforementioned one or more indexed data structures, schematic design database(s) or physical design database(s), electronic circuit design specification database(s), various statistics, various data, rule decks, various design rules, constraints, and/or other information or data such as models, information, or analysis results or result sets (154) (e.g., one or more detailed models, one or more reduced or simplified models (154), persistent and/or temporary analysis results or result sets, analysis constraints or conditions, state information of the analysis or simulation modules, etc.) that may be used to facilitate the performance of various functions to achieve the desired results.

In some embodiments, the computing system include these various resources and modules such that these various resources and modules may be invoked from within the computing system via a computer bus (e.g., a data bus interfacing a microprocessor and the non-transitory computer accessible storage medium or a system bus between a microprocessor and one or more engines in the various resources). In some other embodiments, some or all of these various resources may be located remotely from the computing system such that the computing system may access the some or all of these resources via a computer bus and one or more network components.

The set of resources or modules 152 include more tools that function in conjunction with the aforementioned modules or resources. For example, the set of resources or modules 152 may comprise one or more electrical analysis modules to perform various analyses (e.g., electrical analyses, static and/or transient thermal analyses, etc.) on a model of an electronic design of interest. The set of resources or modules 152 may further optionally include one or more physical optimization and correction modules, signoff modules, and design closure modules (not shown) to perform various optimization, correction, signoff, and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration analyses, IR-drop analyses, other power and signal integrity analyses to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

These resources or modules in the set 152 may include or at least function in conjunction with one or more microprocessors via a computer bus in some embodiments. In these embodiments, a single microprocessor may be included in and thus shared among more than one module even when the computing system 100 includes only one microprocessor 192. A microprocessor may further access some non-transitory memory (e.g., random access memory or RAM) via a system bus 196 to read and/or write data during the microprocessor's execution of processes.

Figure 2A:
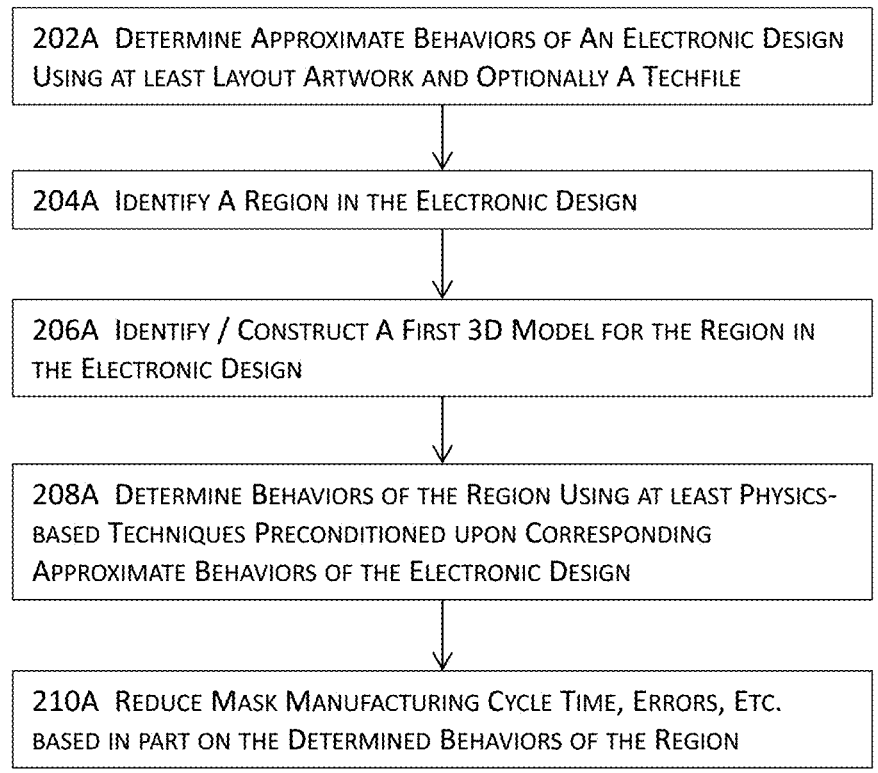
FIG. 2A illustrates a high level block diagram for implementing an electronic design with physical simulation using layout artwork in some embodiments.

FIG. 2A illustrates a high level block diagram for implementing an electronic design with physical simulation using layout artwork in some embodiments. In these embodiments, these techniques described with reference to at least FIG. 2 identify an entire electronic design, generate an approximate three-dimensional (3D) model for the entire electronic design, and perform one or more analyses with the approximate 3D model using techniques such as the finite element methods (FEM), finite difference methods, etc. that discretize the approximate 3D model and solve for the approximate behaviors (e.g., static or transient electrical and/or thermal behaviors) with physics-based techniques or methodologies (202A). These physics-based techniques or methodologies may include methods for solving boundary value problems with governing equations often expressed in, for example, partial differential equations or integral equations. With a 3D model (e.g., an approximate, reduced, or simplified 3D model, a detailed 3D model, etc. that is generated using layout artwork), a physics-based technique or methodology may then discretize or tessellate the 3D model into a set of finite number of elements, transform the governing equation(s) into a set of algebraic equations, and solve for the desired solutions using various numerical methods on one or more computing systems.

Some examples of the physics-based techniques or methodologies may include thermal analysis techniques or methodologies, electromagnetic analysis techniques or methodologies, electro-thermal analysis techniques or methodologies, electromagnetic-thermal analysis techniques or methodologies, static fluid and/or dynamic fluid flow analysis techniques or methodologies, etc. Based on the specific techniques or methodologies, the corresponding behaviors (e.g., approximate behaviors from a reduced 3D model, more precise behaviors from a detailed 3D model, etc.) may be determined. For example, for an analysis involving forced- or natural convective heat transfer over electronic design of a printed circuit board with a plurality of IC packages and discrete components, the approximate behaviors may include the velocity field of the surrounding medium, temperature profile, etc., which may be determined from the solutions of the respective governing equations, and/or any other properties (e.g., electromigration) that may be derived from the solutions of the respective governing equations.

A region of interest is then identified from the entire electronic design (204A), and a more detailed 3D model may be generated (if non-existing) or identified (if pre-existing) to represent the identified region of interest (206A). One or more physics-based analyses may then be performed on the more detailed 3D model using the corresponding portion of the approximate behaviors as inputs (e.g., boundary conditions, initial conditions, etc.) to generate more detailed behaviors for the identified region of interest (208A) by using physics-based techniques or methodologies. When the more detailed behaviors show issues, the design in the identified region of the electronic design may be modified to correct or avoid these issues in order to eliminate or reduce photomask manufacturing cycle times and/or to reduce or eliminate errors on silicon. More details about will be described below with reference to FIGS. 2A-2F. Some simplified working examples of the application of these steps will be described below with reference to FIGS. 3A-3C, 4A-4D, and 5A-5D.

A detailed model may include all the circuit features with full geometric details provided by the layout artwork in some embodiments. For example, a detailed model may include objects that are modeled with all the nodes respectively corresponding to the objects in these embodiments. In some other embodiments, a detailed model may also be generated for an electronic design by first applying a first filter that omits or ignores certain geometric details. For example, a detailed model may include a 3D model that is first filtered by a first filter that ignores or omit changes or rate of changes that are smaller than their respective thresholds (e.g., deviations from straightness smaller than a threshold value for a straight line segment) in the generation for the 3D objects in the 3D model.

A detailed model may also be generated by applying a second filter that omits or ignores certain features that are smaller than one or more threshold values in the layout artwork before the 3D objects are generated for the detailed model in some embodiments. The omission of such features may be based in part or in whole upon the total number of such features or upon the nature or purposes of subsequent analyses. For example, the rectangular openings 504A in FIG. 5A may be ignored or omitted and thus not modeled in a detailed 3D model if the sizes of these rectangular openings fall below a certain threshold in some embodiments.

These rectangular openings may be omitted or ignored and thus not modeled when the 3D model is generated for thermal analyses in some embodiments because of their relatively small contribution in thermal effects. On the other hand, if the total number of rectangular openings exceeds another threshold number for subsequent analyses involving convective heat transfer or fluid flows, these rectangular openings may nevertheless be modeled in a detailed model because the collective effect may be more significant. In some other embodiments where the detailed model is generated for electromagnetic analyses, such rectangular openings may nevertheless be modeled to accurately reflect the behaviors of the underlying electrical analyses.

It shall be noted that regardless of whether certain features are modeled or omitted, the effects of these features may be accommodated in a detailed model. In the example of the rectangular openings that are omitted in a detailed 3D model, the actual surface area and/or the actual volume of the metal layer may be adjusted to accommodate these rectangular openings in some embodiments.

In some of the embodiments illustrated in FIG. 2A, the entire electronic design may be modeled as a reduced or simplified 3D model. Nonetheless, it shall be noted that an entire electronic design does not always have to be modeled as a reduced 3D model. That is, the level of resolution or granularity of the model for the entire electronic design may also vary. In addition or in the alternative, these techniques described herein provide the ability that allows users to custom select features, components, or devices for different modeling techniques and thus enables the use of a hybrid model in the generation of the 3D model for the entire electronic design. For example, an IC package on a PCB of a computing system may be generated as one or more heavily simplified blocks with bumps for connection to a semiconductor chip without additional geometric details in the 3D model of the PCB, whereas the IC package or the semiconductor chip therein may be generated at a more detailed resolution or granularity level with more or even full geometric details to provide more detailed visibility and resolution in the 3D model and hence the analysis results.

Figure 2B:
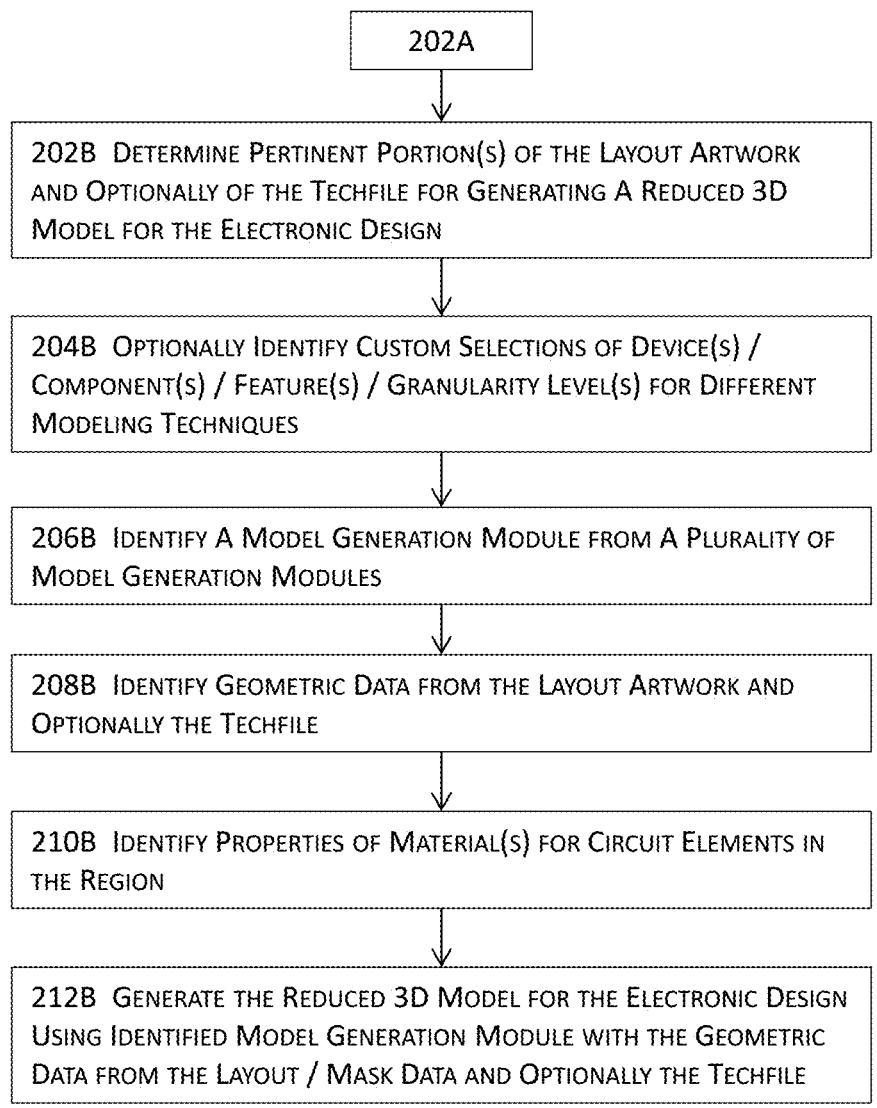

FIGS. 2B-2E respectively illustrate more detailed block diagrams for the block diagram for implementing an electronic design with physical simulation using layout artwork illustrated in FIG. 2A in some embodiments. FIG. 2B illustrates more details about determining approximate behaviors of an electronic design using at least the layout artwork and optionally a corresponding techfile or technology file (202A). The layout artwork includes data in an exchange format for data exchange or transfer among participants in the design and manufacture of electronic designs such as semiconductor fabrication foundries, electronic design automation (EDA) tool providers, designers, etc. for creation of photomasks for electronic designs. The layout artwork may be expressed in many different forms including, for example, GDSII, OASIS, etc. and may include information or definitions of shapes or locations of boundaries of shapes in an electronic design. Layout artwork may also include the definitions or specifications of types of properties that each shape in an electronic design may have, patterns, how shapes or patterns may be organized into cells, etc.

The behaviors determined using the process illustrated in FIG. 2B are termed "approximate behaviors" because the model referenced of the entire electronic design in the process represents a reduced or simplified model that is filtered by a third filter that omits or ignores some geometric details of the entire electronic design in some embodiments. In these embodiments, the third filter is applied to the layout artwork for a reduced or simplified model to omit and discard at least one feature, circuit component, or device in the electronic design that the reduced or simplified model represents.

In some embodiments, a model is reduced or simplified because a characteristic or a property is not precisely modeled and associated with or attached to a specific part of an electronic design. For example, a layer in an electronic design may include various metal shapes and dielectric shapes each having its specific geometries and specific properties. Nonetheless, a reduced or simplified model may determine an average property for the layer by determining a weighted average of corresponding specific property values of all these shapes in the layer with respect to, for example, the respective percentages of these shapes.

This weighted average may then be associated with the layer, regardless of whether individual shapes are modeled in details. A 3D model generated with simplifications or reductions thus provides approximate, rather than exact or close to exact behaviors of the underlying electronic design. The aforementioned filters may be included in or launched by one or more layout simulation or analysis modules (e.g., 104 in FIG. 1) and may be applied in multiple stages (e.g., in generating a reduced or simplified 3D model for an entire electronic design, in generating a detailed 3D model for a region identified in the entire electronic design, etc.) based at least in part upon the respective criteria (e.g., for performance-accuracy criteria). In some embodiments, one or more pertinent portions of the layout artwork or the one or more pertinent technology files may be identified or determined at 202B for generating a reduced 3D model for the entire electronic design.

In some of these embodiments where the layout artwork stores only the geometric or location information of various shapes in the layout of the electronic design, and another technology file is used to store information such as the thickness information, the materials, etc. of various circuit elements, the reduced 3D model may also be optionally be generated or identified at 202B by further referencing the technology file. A technology file includes, for example, information that can be used to customize EDA tools for specific technology processes. For example, a techfile or a technology file may include the definitions of layers, components, devices, etc. that are available for one or more particular fabrication processes. A technology file may thus include information such as the thickness information for various layers, the materials of various circuit elements, etc. A technology file may also include the generic and/or application-specific classes of layer rules, physical rules, and/or electrical rules for the one or more particular fabrication processes With the information of the materials available, various electrical and/or physical properties may be identified. These electrical and/or physical properties may include, for example, electrical resistivities (or specific electrical resistance, volume resistivity), electrical conductivity (or specific conductance), thermal conductivities (Kx, Ky, Kz), thermal conductance (C), µ-factor (coefficient of thermal transmittance) or thermal resistance (1/(µ-factor)), thermal mass (or specific heat, thermal lag, or heat capacity), or any other properties that may be referenced to facilitate the desired analyses, etc.

The computing system executing the process of 202A may further optionally identify a custom selection of one or more features, circuit components, or devices for reduction or simplification at 202B. In some embodiments, a user may custom select one or more features, circuit components, or devices for reduction or simplification. In some other embodiments, a user may identify a hierarchical level or a granularity or resolution level as the level at which the reduced model is to be generated, and the computing system automatically identify and suppress the lower hierarchical levels situated below the identified hierarchical level in the generation of the reduced model. A granularity level or a resolution level indicates the level of details to be modeled in a 3D model for an electronic design or a portion thereof. Some examples of granularity or resolution levels may include rack level, system level, PCB level, package level, semiconductor chip level, or even various hierarchical levels within a semiconductor chip. A granularity or resolution level may or may not correspond to the hierarchical levels of an electronic design and may be configurable by users to instruct which level of details is to be modeled by the layout simulation or analysis modules and which other levels of details to ignore for the generation of 3D models.

In some of these embodiments, the design data at these lower hierarchical levels will not be faithfully modeled in the reduced model, but the impact of the design data will be reflected in the reduced model. In an example of thermal analyses, if the IC package level is identified as the granularity level for generating the reduced model, the IC itself may be modeled as a block, but the layers, which situated at a lower hierarchical level than the IC package level, in the IC will not be modeled, at least not with full geometric details. Nonetheless, the pertinent material properties (e.g., the tensorial thermal conductivity—Kx, Ky, and Kz—or isotropic thermal conductivity K) may still be reflected in the block.

For example, if the layout artwork (or some other sources of information) indicates that the first metal layer contains 60% copper for various metal shapes and interconnects and 40% dielectric material, the thermal conductivities (e.g., Kx, Ky, and Kz or simply in-plane and out-of-plane thermal conductivities) may be determined from the corresponding thermal conductivities of the materials in the first metal layer by, for example, averaging the thermal conductivities of various materials according to their respective percentages in the first layer of the reduced model so that the thermal conductivities of various materials are reflected in the reduced model although the geometric details other than perhaps the boundaries of the first layers are not considered or processed in the reduced model.

In some embodiments, a user may custom select one or more features, components, devices, etc. that are subject to different modeling techniques at 204B. For example, a user may first select a hierarchical level or a granularity level for the reduced model and then select a particular device that is situated above, at, or below the hierarchical level to instruct the computing system to model the particular device with a different model generation module. Once the computing system receives this user instruction, the computing system may invoke the corresponding model generation module and hence change the state of the computing system (e.g., the corresponding model generation module from an unlaunched state to a launched state) to model the particular device. For example, this particular device may be further reduced or simplified with a reduced model generation module in some embodiments or model in greater details with a detailed model generation module in some other embodiments.

Once the granularity level (or resolution level) or the hierarchical level and optionally the custom selected features, components, or devices are identified at 204B, the computing system may automatically identify one or more model generation modules from a plurality of model generation modules at 206B. Various data needed for the generation of the reduced model may be identified at 208B from the layout artwork and optionally from the technology file. One or more properties needed for the desired analyses may be identified at 210B based at least in part upon the circuit component materials provided in, for example, the technology file. Some examples of these one or more properties may include specific heat capacity ($c_p$), thermal conductivity, density, thermal diffusivity (a), etc. for thermal analyses, charge density, current density, permittivity, permeability, etc. for analysis involving electromagnetism. The reduced 3D model for the electronic design may then be generated at 212B by using the one or more model generation modules identified at 206B with the various data identified at 208B, the properties identified at 210B.

In an example of modeling a wire on a layer, the locations of the wire or the coordinates thereof may be identified from, for example, a GDSII file, and the thickness of the wire may be identified from the corresponding technology file. A 3D object may be generated for the wire by extruding the two-dimensional shape of the wire defined by the locations or coordinates of the wire by the thickness for the wire. The material properties (e.g., electrical conductivity, thermal conductivity, or any other suitable properties) may be associated with the newly generated 3D object of the wire. For example, the 3D object of the reduced 3D model may be stored in an indexed database table that may further stores or link the corresponding material properties for the 3D object in the reduced 3D model.

FIG. 2C illustrates more details about identifying a region in the electronic design (204A) in FIG. 2A. In some embodiments, the computing system executing the process of 204A may identify a user input for a user defined region at 202C. In some of these embodiments, a user may select a region of interest by identifying the region by drawing an area with a pointing device in the graphical display of the electronic design in some embodiments or by identifying the region by selecting a set of one or more devices from a textual, collapsible, hierarchical tree listing the circuit components at various hierarchical levels in the electronic design in some other embodiments. In some embodiments, a region may be identified by the computing system that partitions an electronic design into a plurality of partitions and selects a partition as the region from the plurality of partitions.

The computing system may optionally determine the availability of one or more other 3D models for one or more other portions in the electronic design at 204C. These one or more 3D models may be previously generated and/or analyzed for the same electronic design or for one or more other electronic designs. In order to reduce computational resource utilization, a 3D model generated for a first region of an electronic design may be reused or referenced in the generation of another 3D model for a second region of the same electronic design or anther electronic design that contains at least a portion of the first region so that once a 3D model is generated for a region of an electronic design, this generated 3D model may be reused or referenced in subsequent processing of the same electronic design or in other processing of different electronic designs.

The identified region may be optionally adjusted into a first adjusted region at 206C by, for example, the one or more layout simulation or analysis modules 104 based in part or in whole upon one or more criteria in some embodiments. These one or more criteria may include, for example, the availability of one or more other 3D models determined at 204C, whether an existing 3D model is located within predetermined threshold proximity from the identified region, etc. For example, when an existing 3D model is located within predetermined threshold proximity of the region identified at 202C, a layout simulation or analysis module may expand the identified region either uniformly or non-uniformly into the first adjusted region so that the first adjusted region overlaps the portion for which the existing 3D model is generated. In some of these embodiments where a 3D model is discretized for analysis purposes, a layout simulation or analysis module may consider the meshes and/or nodes in at least the overlapping portion of an existing model in the generation or discretization of the 3D model for the region based at least in part upon, for example, numerical stability, consistency, errors, and/or performance of subsequent analyses.

When it is determined that one or more other 3D models exist, the computing system may identify one or more model characteristics of these one or more other 3D models at 208C. These one or more model characteristics may include, for example, characteristic(s) of the meshes such as the sizes, shapes, and/or ratios of meshes, edges, etc. In some of these embodiments, only the model characteristics near the neighboring boundaries of an existing 3D model relative to the region identified at 202C will be considered at 208C because these model characteristics may exert more influence in the generation and/or discretization of the 3D model for the region.

The identified region may also be optionally adjusted at 210C based in part or in whole upon the model characteristics of the one or more other 3D models identified at 208C. In an example where an existing 3D model in another region of the electronic design is not located within a threshold proximity of the identified region, the region identified at 202C may be expanded to include an additional area that may be used for transitioning the meshes of the existing 3D model to the meshes of the 3D model for the identified region. In another example where an existing 3D model in another region is located within a threshold proximity of the identified region, the region may be expanded to overlap a portion of the another region, and the meshes in the overlapping portion of the existing 3D model may be explicitly used or implicitly referenced in the generation and/or discretizing of the 3D model for the region identified at 202C. In some of these embodiments, the identified region may be optionally adjusted based further in part upon one or more criteria such as the stability and/or performance requirement(s) of the discretization and/or analysis of the 3D model for the region.

The portion of the layout artwork pertaining to the identified region may be optionally simplified or reduced at 212C based at least in part upon one or more criteria including, for example, predetermined thresholds, stability and/or performance requirement of discretization and/or subsequent analyses of the 3D model, and/or the utilization of computational resources in the generation and/or analysis of the 3D model. In some of these embodiments, a layout simulation or analysis module may dynamically monitor the computational resource utilization to predict and report potential or actual processing bottlenecks so that the processing may be adjusted accordingly for better efficiency and effectiveness. In these embodiments, a layout simulation or analysis module may identify or predict the occurrence of a processing bottleneck in the processing (e.g., discretization, analysis, etc.) at 214C.

A processing bottleneck may be identified by, for example, dynamically monitoring the progress of various processing (e.g., discretization of a 3D model, analysis on a 3D model, convergence, etc.) and identify the processing bottleneck when the monitored progress falls below a predetermined threshold in some embodiments. In some other embodiments, a layout simulation or analysis module may predict the occurrences of processing bottlenecks by pre-examining one or more aspects of the corresponding layout artwork.

For example, a layout simulation or analysis module may query an indexed data structure to retrieve the maximum length of a feature and the minimum length of the same feature or of another feature in a 3D model from the pertinent layout artwork and determine the ratio of this maximum length and the minimum length. When this ratio exceeds certain threshold value, the layout simulation or analysis module may safely assume that the discretization or analysis of this 3D model may consume extra runtime or resources and report an occurrence of a processing bottleneck. The layout simulation or analysis module may further optionally report the area(s) that may have contributed to the determination or prediction of a processing bottleneck.

The layout simulation or analysis module may reduce the observed or predicted processing bottleneck at 214C based at least in part upon the criticality of the circuit portions that may have contributed to the determination or prediction of the processing bottleneck.

FIG. 2D illustrates more details about identifying (if pre-existing) or generating (if non-existing) a first 3D model at 206A for the identified region. In some of these embodiments, existing 3D models, if existing, in one or more portions of the electronic design may be optionally accommodated in the generation, discretization, and/or analysis of the first 3D model to be generated for the identified region at 206A. Accommodating an existing 3D model in the generation, discretization, and/or analysis of the first 3D model to be generated at 206A may include adjusting the region for which the first 3D model is generated to overlap with the area represented by the existing 3D model; accounting for the sizes, locations, and/or shapes of existing meshes in the existing 3D model in the discretization of the first 3D model for the region; altering the shape and/or size of the region for which the first 3D model is to be generated based on the relative positions of the portion corresponding to the existing 3D model that does not overlap the region; and/or identifying a mesh transition area around the existing 3D model that is included in the region so that the existing meshes of the existing 3D model may be reused in the first 3D model to be generated for the region.

In these embodiments, a layout simulation or analysis module may optionally determine whether the electronic design identified at 202A corresponds to one or more existing 3D models at 202D. If the determination at 202D is affirmative, an existing 3D model may be identified at 204D. If the existing 3D model identified at 204D has already been analyzed with the same physics-based techniques or methodologies used in 208A, the analysis results of the existing 3D model may also be identified at 204D. The identified existing 3D model may be incorporated at 206D into the first 3D model for the region when the portion of the electronic design corresponding to the existing 3D model is included within the region. A layout simulation or analysis module may determine the final location, size, and/or shape of the region based in part or in whole upon the one or more existing 3D models at 208D.

In some other embodiments, identifying or generating a first 3D model for the region may include processing of the pertinent layout artwork corresponding to the identified region for which the first 3D model is to be generated. For generating a 3D shape in the first 3D model, a layout simulation or analysis module may identify two- or one-dimensional shape data from the pertinent layout artwork (e.g., for geometric or location data) and optionally from the corresponding technology file (e.g., for definitions of thickness, materials, etc.) at 210D. The shape data identified at 210D may be optionally reduced at 212D into reduced shape data based at least in part upon one or more thresholds.

For example, any change in the size, direction, and/or length of a feature (e.g., an edge of a shape) that falls below a predetermined threshold may be reduced or ignored. For example, a relatively small change in the width of an edge may be ignored so that the edge may be modeled as a straight line segment. As another example, an arc may be reduced into a plurality of straight line segments in the first 3D model for the region. Such reduction of shape data not only reduces the sizes and complexity of the geometries to be modeled in the first 3D model for storage in memory but also reduces the small meshes or elements resulting from such changes that may cause numerical instability and/or consume an unnecessary amount of computational resources while having limited return on the unnecessary amount of computational resources.

With the shape data identified at 210D and optionally reduced at 212D, a 3D object may be generated for the 3D shape at 214D. For example, a layout simulation or analysis module may determine the 2D shape of a circuit component from the layout artwork and extrude the 2D shape with the thickness information from a technology file to generate the 3D object for the 3D circuit feature in the first model. One or more properties needed for subsequent analyses may be associated with the 3D object in the first 3D model at 218D. The first 3D model for the region may be discretized into a plurality of meshes at 220D based at least in part upon an accuracy requirement, a performance requirement, or a sliding balance between the accuracy requirement and the performance requirement.

In some of the aforementioned embodiments, the discretization may be optionally based in part or in whole upon the characteristics of one or more discretized, existing 3D models. In an example where the first 3D model is spaced at a distance from an discretized, existing 3D model, the first 3D model may be discretized in consideration of the existing meshes in the discretized, existing 3D model based in part or in whole on numerical stability, consistency, errors, convergence, and/or performance requirements, etc. to ensure sufficiently smooth transition from the existing meshes of the discretized, existing 3D models to the new meshes for the first 3D model.

Figure 2E:
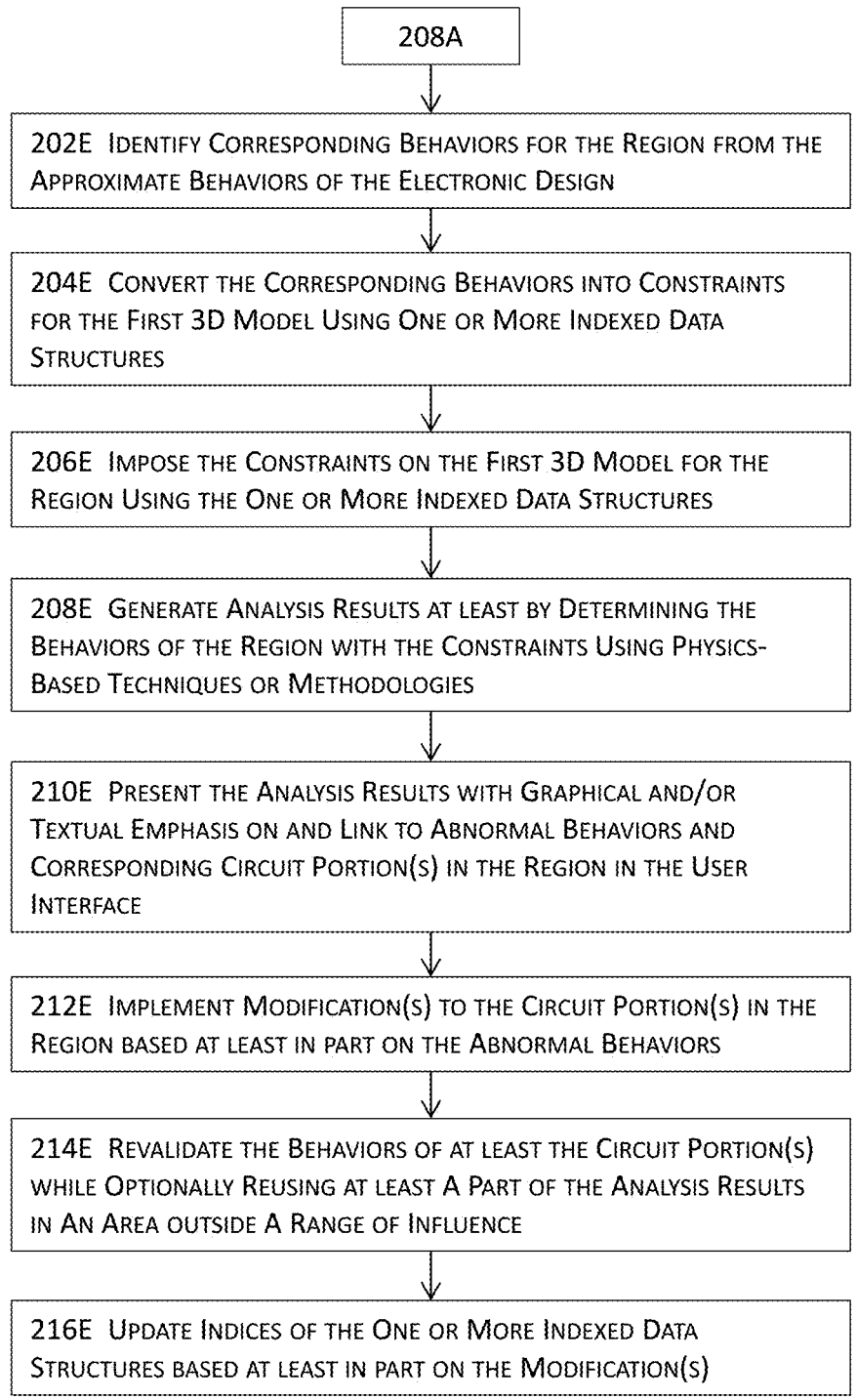

FIG. 2E illustrates more details about the process 208A of determining behaviors of the region using at least physics-based techniques with the corresponding approximate behaviors that correspond to the region in the electronic design determined at 202A. In these embodiments, the corresponding portion of the approximate behaviors may be provided as inputs by, for example, imposing the corresponding portion of the approximate behaviors on the more detailed 3D model as boundary conditions, initial conditions, and/or constraints, etc. for the physics-based techniques or methodologies that are used to perform the one or more physics-based analyses.

These physics-based techniques or methodologies may thus be preconditioned upon at least the corresponding portion of the approximate behaviors. For example, a nodal temperature value or heat flux in the approximate behaviors for a node may be imposed as an initial condition (or seed value) at or around the corresponding node in the more detailed 3D model to represent the value at or around this corresponding node at the beginning of an iterative process in the one or more physics-based analyses. As a non-limiting example, this nodal temperature or heat flux may be provided to a physics-based solver as the value of the corresponding node as the seed value at the initial time of a transient analysis or as the seed value at the first iteration of an iterative solution process for a static or steady-state solution. At 202E, the corresponding behaviors for the region may be identified from the approximate behaviors of the entire electronic design by, for example, querying an indexed data structure storing therein the approximate behaviors while referencing the region.

In some embodiments where a first boundary segment of the region coincides with existing nodes in the reduced 3D model of the electronic design, the nodal values of the behaviors at these existing nodes may be queried and stored for the first boundary segment of the region and subsequently imposed on the corresponding meshes or nodes of the first 3D model for the region. In some other embodiments where a second boundary segment of the region does not coincide with existing nodes in the reduced 3D model of the electronic design, average values of the nodal values of neighboring nodes in the reduced 3D model may be determined for the second boundary segment of the region. In this latter example, these average values may be mapped to the second boundary segment of the region and subsequently mapped to the corresponding meshes or nodes of the first 3D model for the region. The aforementioned nodal values may be stored in the aforementioned one or more indexed data structures that may be further indexed with, for example, the node numbers (if the node numbers are unique) or with the mesh number-node number pair for expedient and efficient access.

The corresponding behaviors identified at 202E may be converted at 204E into constraints or conditions for the first 3D model of the region using one or more indexed data structures. These constraints or conditions may be imposed on the corresponding portions of the first 3D model at 206E using the one or more indexed data structures. These constraints may be referenced in subsequent electrical and/or thermal analyses as boundary conditions and/or initial conditions in some embodiments.

One or more electrical, thermal, or electro-thermal analyses may be performed on the first 3D model at 208E to determine the electrical, thermal, or electro-thermal behaviors of the region using physics-based analysis techniques or methodologies (e.g., conduction with Fourier's law or the Heat equation, convection with convection-diffusion equation, radiation with the Stefan-Boltzmann equation, advection, etc.) with the imposed constraints or conditions.

The analysis results may be presented with graphical and/or textual emphasis on, for example, abnormal behaviors and their respective corresponding circuit portions in the region at 210E in a user interface. In some of these embodiments, the analysis may be linked with one or more link structures to the respective corresponding circuit portions or specific circuit components therein. These analysis results, abnormal behaviors, or respective corresponding circuit portions or circuit components may be stored in one or more indexed data structures to provide expedient and efficient access.

The region may be modified at 212E to implement one or more modifications to the respective corresponding circuit portions or to the specific circuit components in the region to reduce or eliminate the abnormal behaviors. With these one or more modifications, the behaviors of at least the respective corresponding circuit portions or the specific circuit components in the region may be revalidated at 214E. In some embodiments, the entire region may be revalidated. In some other embodiments, only the respective corresponding circuit portions or the specific circuit components in the region are revalidated while the remaining portions of the region are not revalidated, and thus their corresponding analysis results are reused in the revalidation of the respective corresponding circuit portions or the specific circuit components in the region. In these embodiments, the remaining portions can be determined based at least in part upon the range of influence of the abnormal behaviors. For example, a remaining portion may be determined when the abnormal behaviors, once propagated over a threshold distance, are attenuated to a level below a certain threshold limit. With at least the respective corresponding circuit portions or the specific circuit components in the region revalidated, the indices of the affected one or more indexed data structures may be updated at 216E based at least in part upon the one or more modifications to the respective corresponding circuit portions or the specific circuit components in the region.

Figure 2F:
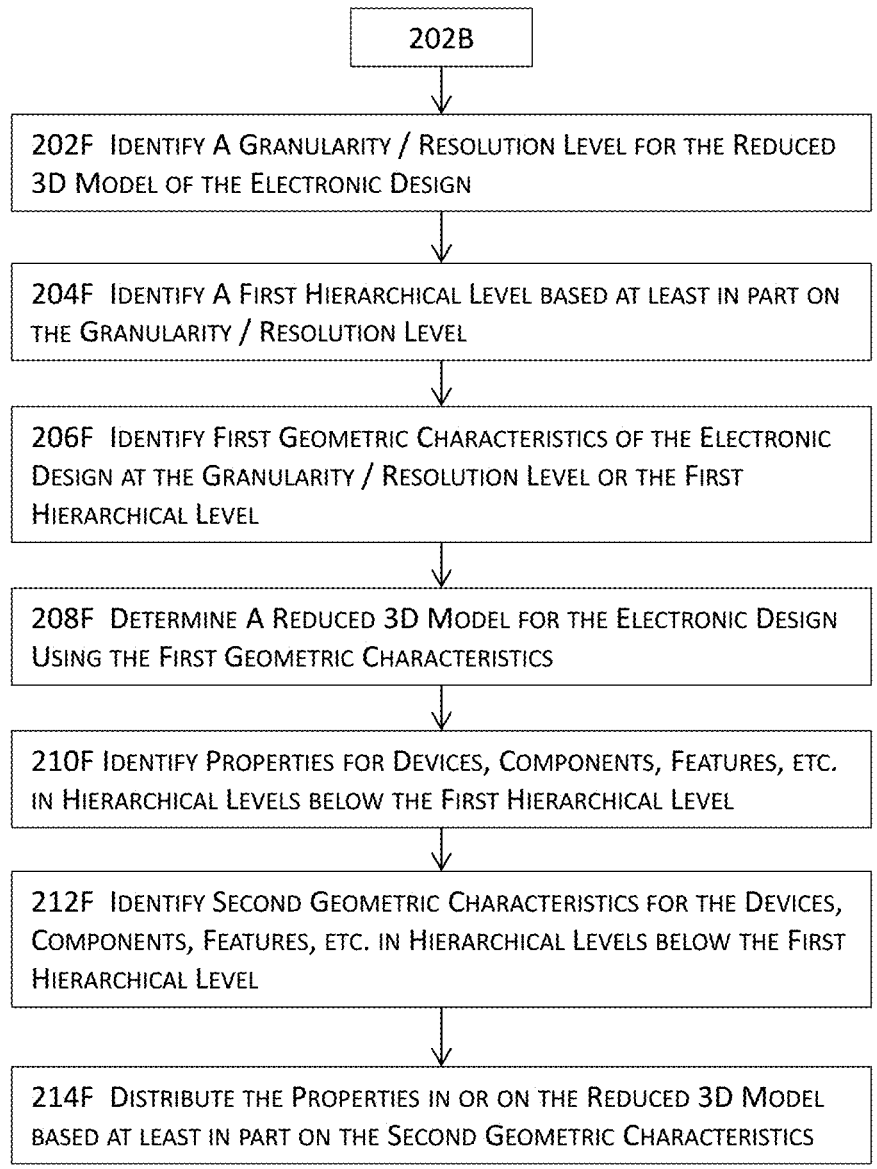
FIG. 2F illustrates a more detailed block diagram for the block diagram for implementing an electronic design with physical simulation using layout artwork illustrated in FIG. 2B in some embodiments.

FIG. 2F illustrates a more detailed block diagram for the block diagram for implementing an electronic design with physical simulation using layout artwork illustrated in FIG. 2B in some embodiments. More specifically, FIG. 2F illustrates more details about generating a reduced 3D model for an electronic design (202B) illustrated in FIG. 2B. In these embodiments, a granularity level or a resolution level may be identified at 202F for the reduced 3D model of the electronic design. For example, a user may identify a package level by, for example, clicking on an IC package with a pointing device in the layout window to indicate the user's intent to model the electronic design to show details at and above the IC package level.

A first hierarchical level may be identified at 204F by a layout simulation or analysis module based in part or in whole upon the granularity or resolution level identified at 202F. In some embodiments, the granularity or resolution level may be identified as the first hierarchical level at 204F so that design details at or above the IC package level will the modeled with the layout artwork. In these embodiments, the granularity levels are identical to the hierarchical levels. In some other embodiments, the hierarchical level at one or more lower hierarchies than the granularity or resolution level (e.g., the package level) may be identified at 204F as the first hierarchical level so that circuit component details at or above this hierarchical level will be modeled with layout artwork. In these embodiments, the hierarchical levels are different from the granularity or resolution level. The granularity or resolution level and hence the relation between granularity or resolution levels and hierarchical levels may be configured by user. In addition, some embodiments provide users with the ability to custom select circuit component designs to be modeled as a reduced 3D model or a detailed 3D model with one or more levels of details, and various 3D models with different levels of details may be integrated together into an integrated 3D model that may be further discretized and analyzed as described in this disclosure.

At 206F, a layout simulation or analysis module may identify first geometric characteristics of the electronic design at the granularity or resolution level in some embodiments or at the first hierarchical level in some other embodiments. These geometric characteristics may be identified directly from or derived indirectly from the layout artwork (e.g., locations or geometric data in GDSII data) and one or more technology files (e.g., thickness information in a technology file). In an example where the IC package level is identified as the granularity level or the first hierarchical level to model a PCB having a plurality of IC packages and discrete components as a reduced 3D model, the first geometric characteristics may include the geometric data of the features of the PCB and the plurality of IC package. The first geometric characteristics may also optionally include the geometric data (e.g., thickness) of various layers of the printed circuit board or any other default selections of circuit component designs or custom selections of circuit component designs by the user.

A reduced 3D model including pertinent 3D objects may be generated at 208F for the entire electronic design using at least the first geometric characteristics. As described herein, a 3D object may be generated by extruding a 2D shape or profile, which is generated by referencing the location or geometric data in the layout artwork, for a thickness value obtained from the corresponding technology file.

Pertinent properties and their respective values may be identified at 210F for various features, components, devices, etc. in one or more lower hierarchical levels below the granularity or resolution level or the first hierarchical level. These various features components, devices, etc. will not be modeled as corresponding 3D objects, yet the locations, distributions, and/or the values of their property values can be determined and distributed on the 3D object located at the granularity or resolution level or the first hierarchical level. To this end, second geometric characteristics for the circuit features, circuit components, devices, etc. may be identified at 212F in one or more lower hierarchical levels below the first hierarchical level. The properties for the circuit features, circuit components, devices, etc. may then be distributed at 214F in or on the reduced 3D model based in part or in whole upon the second geometric characteristics.

As a working example, a PCB including portions occupied by conductors and other portions occupied by dielectric materials may be modeled as a reduced 3D block although the conductors and dielectric materials are not modeled in the 3D block. Nonetheless, the thermal conductivities of the conductors and those of the dielectric materials on a layer of the PCB may nevertheless be accommodated by, for example, determining the average thermal conductivity value based on the respective percentages of conductors and dielectric materials in the layer.

The average thermal conductivity value may then be distributed over the entire layer of the PCB in some embodiments. In some other embodiments where conductors and dielectric materials are not approximately evenly distributed across a surface (e.g., a metal 2 layer in a semiconductor chip), the surface may be partitioned into a plurality of portions based approximately on the uneven distribution of conductors and dielectric materials, and a respective average value may be evenly distributed over the corresponding portion to more closely approximate the actual distribution of conductors and dielectric materials, although such conductors and dielectric materials are not actually modeled in the 3D object including the surface.

Figure 3A:
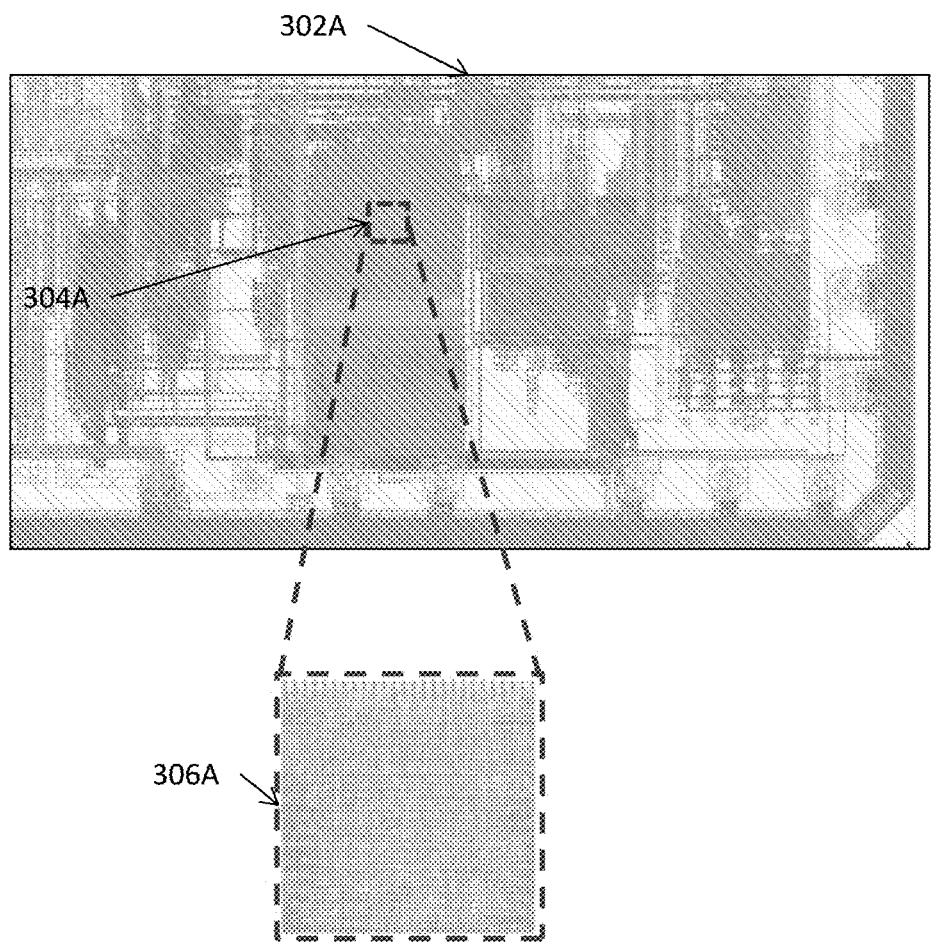
FIGS. 3A-3C jointly illustrate examples of implementing an electronic design with physical simulation using layout artwork using various techniques described herein in some embodiments.
Figure 3B:
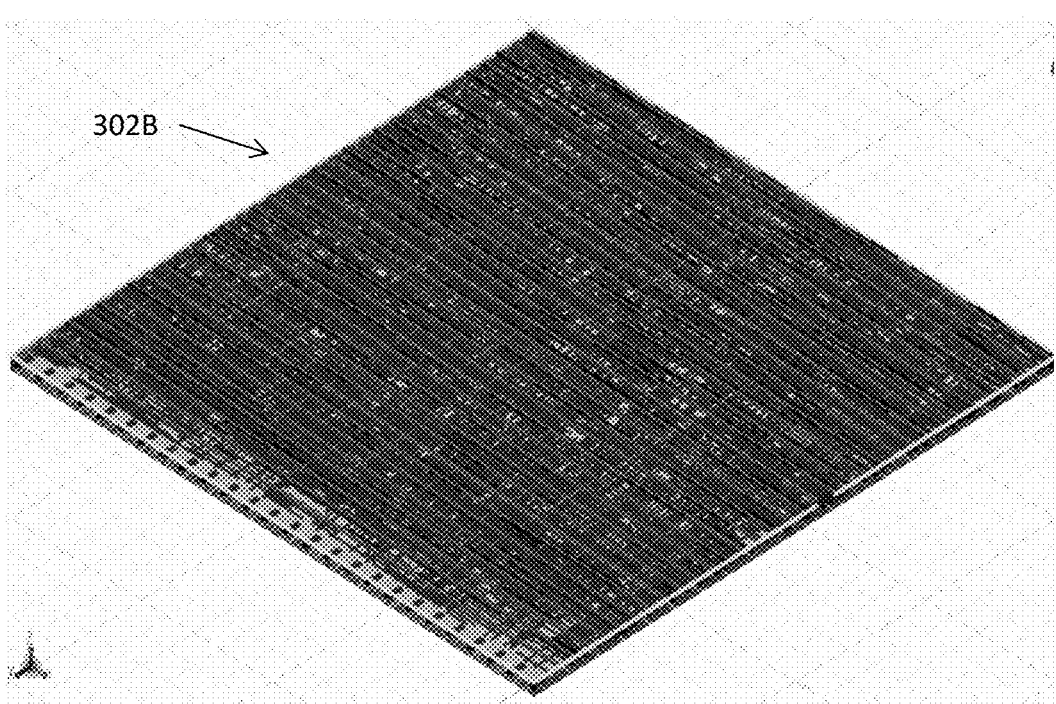
Figure 3C:
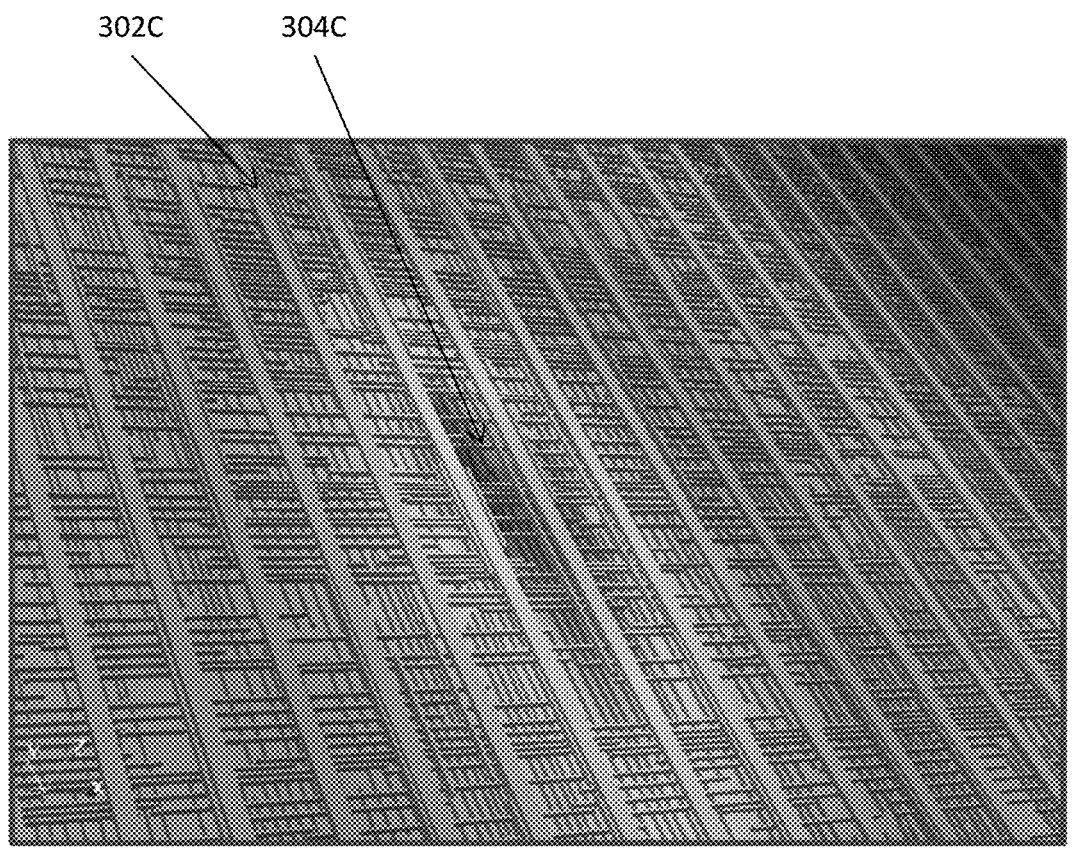

FIGS. 3A-3C jointly illustrate examples of implementing an electronic design with physical simulation using layout artwork using various techniques described herein in some embodiments. FIG. 3A illustrates the application of some techniques described herein to an example of a portion of a PCB 302A with a plurality of IC packages, interconnects, and discrete components. More specifically, FIG. 3A illustrates the identification of a region 304A (e.g., via a user selecting an area in the electronic design with a pointing device in a graphical user interface). 306A illustrates a zoom-in view to illustrate the complexity of the identified region 304A.

FIG. 3B illustrates an example of a detailed 3D model 302B that is generated with the corresponding layout artwork (e.g., GDSII) for the identified region 304A (or the zoom-in view 306A) in FIG. 3A. This detailed 3D model 302B may be analyzed with physics-based techniques or methodologies using, for example, finite element methods. As FIG. 3B shows, these techniques described herein can faithfully model a region using the layout artwork that is also used by semiconductor foundries to manufacture the electronic design.

FIG. 3B illustrates an example of temperature distribution 302C overlaid on a smaller portion of the detailed 3D model 302B for clarity. FIG. 3C further illustrates finer details of the detailed 3D model 302B for the identified region 304A. The desired temperature(s) for each modeled feature can be obtained by querying the result sets of the corresponding analyses (e.g., thermal analysis for temperature distribution in this example).

Even finer granularity levels of details may be obtained by querying the result sets that may be stored in an indexed data structure that either stores the model information (e.g., nodes, node identifications, meshes, mesh identifications, etc.) or is cross-linked to another indexed data structures that stores the model information. For example, an interconnect 304C may be modeled to correspond to a plurality of nodes in the detailed 3D model. In this example, specific nodal values at specific nodes in the detailed 3D model can also be retrieved from the result sets of the corresponding analysis by querying the specific nodes to return their respective nodal values.

Figure 3E:
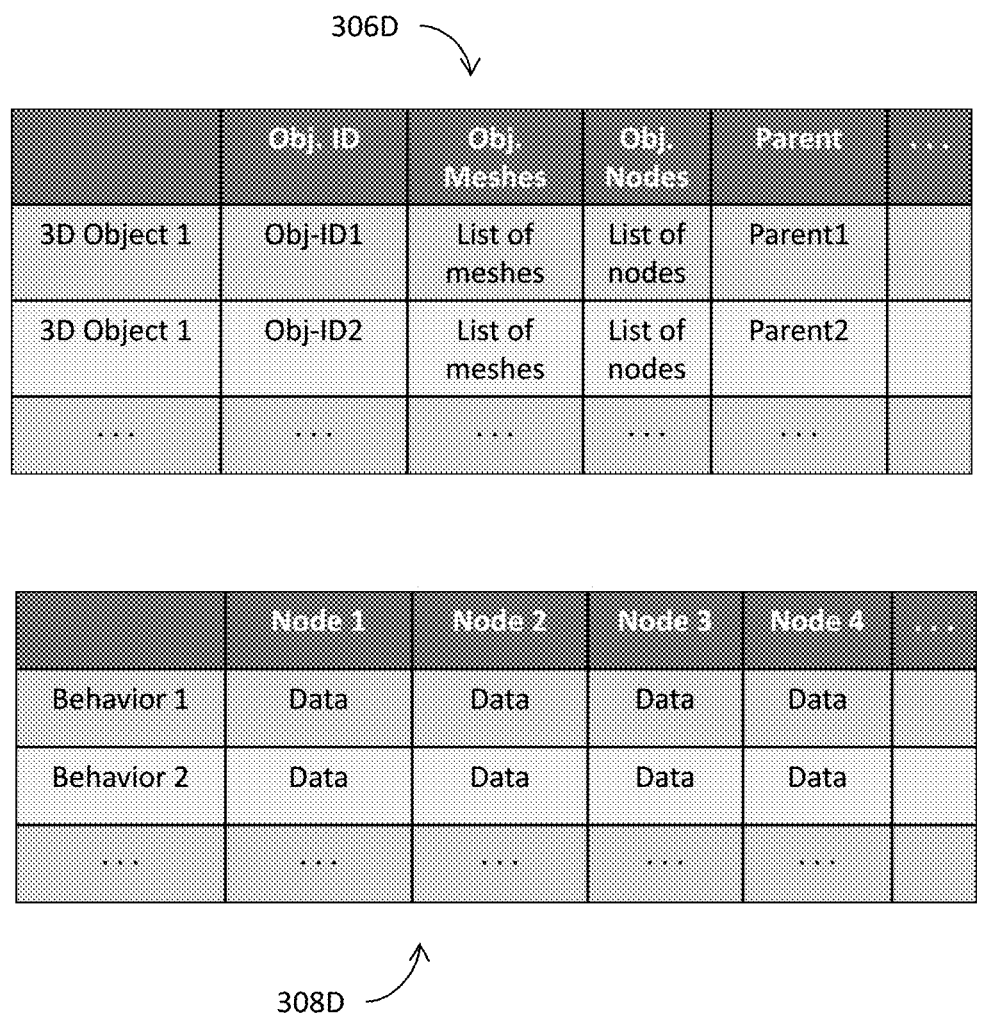

FIGS. 3D-3E illustrate a simplified example of one or more indexed data structures. More specifically, these one or more indexed data structures may include, for example, schematic data (302D) of various schematic components in an electronic design. Some examples of schematic data of a schematic component include its schematic identifier, schematic symbol, its parent in the electronic design at the schematic abstraction level, its schematic data, connectivity (not shown), or any other data at the schematic abstraction level, etc. The schematic data may be arranged and stored in an indexed data structure and further indexed with unique database keys such as the schematic identifiers (if unique) or a combination of a plurality of identifiers (e.g., a combination of the schematic identifier, if non-unique, and its parent identifier, etc.)

These one or more indexed data structures may include, for example, layout data (304D) of various layout components in the same electronic design. Some examples of layout data of a layout component may include its layout identifier, its parent, the layout data, connectivity (not shown), etc. Similar to the schematic data, the layout data may be stored in a separate indexed data structure (e.g., a layout database) or in the same indexed data structure with the corresponding schematic data; and this indexed data structure may be indexed with unique database keys such as the layout identifiers (if unique) or a combination of a plurality of identifiers (e.g., a combination of the layout identifier, if non-unique, and its parent identifier, etc.) In some embodiments where the layout data is stored in a separate indexed data structure, the layout data may be linked to the corresponding schematic data by using one or more link structures (e.g., symbolic links, pointers, references, etc.)

These one or more indexed data structures may include, for example, model data (306D) of various elements in a 3D model (e.g., an approximate model, a more detailed 3D model, etc.) of the same electronic design. Some examples of model data of a 3D object in the 3D model may include its object identifier, its parent, its meshes with respective mesh identifiers (which may be stored in a plurality of rows), its nodes with respective node identifiers (which may also be stored in a plurality of rows), etc. As a result, this model data 306D may be stored in a three- or higher-dimensional data structure. Similar to the schematic data and layout data, the model data may be stored in a separate indexed data structure (e.g., a model database) or in the same indexed data structure with the corresponding schematic and layout data; and this indexed data structure may also be indexed with unique database keys such as the object identifiers (if unique) or a combination of a plurality of identifiers (e.g., a combination of the object identifier, if non-unique, and its parent identifier, etc.) In some embodiments where the model data is stored in a separate indexed data structure, the model data may also be linked to the corresponding schematic and layout data by using one or more link structures (e.g., symbolic links, pointers, references, etc.)

These one or more indexed data structures may include, for example, behavior data (308D) determined for the 3D model using physics-based techniques or methodologies. Some examples of behavior data of the 3D model may include the nodal solutions at a plurality of nodes in the 3D model, the node identifiers (not shown), the identifiers of the meshes to which the nodes belong (not shown), etc. Similar to the schematic data, layout data, and the model data, the behavior data may be stored in a separate indexed data structure (e.g., a solution database) or in the same indexed data structure with the corresponding schematic, layout, and model data; and this indexed data structure may also be indexed with unique database keys. In some embodiments where the behavior data is stored in a separate indexed data structure, the behavior data may also be linked to the corresponding schematic data, the layout data, and/or the model data by using one or more link structures (e.g., symbolic links, pointers, references, etc.)

Figure 4A:
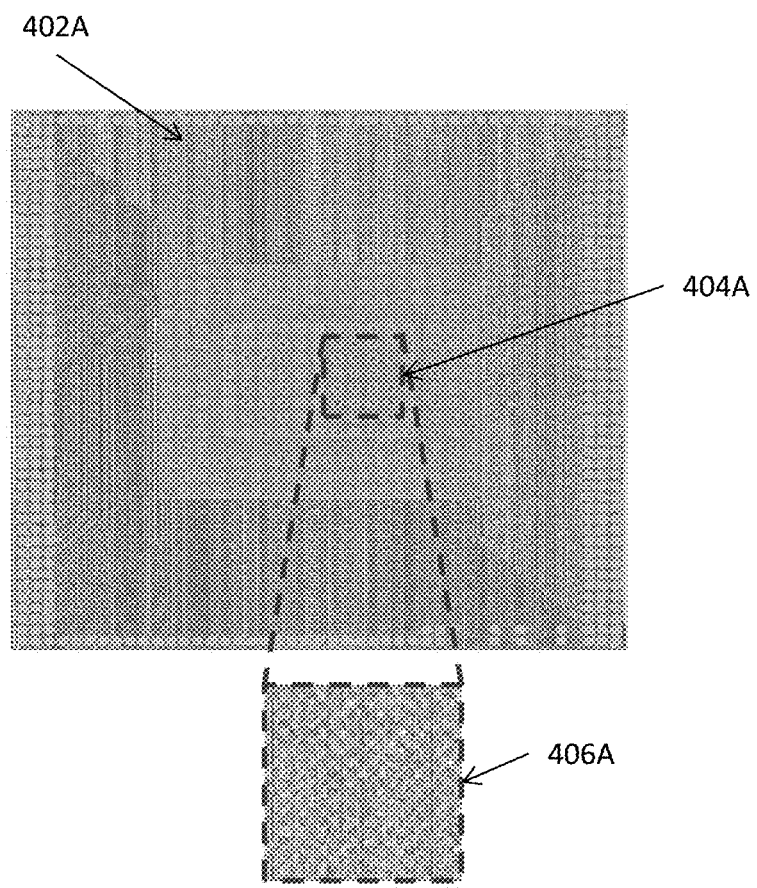
FIGS. 4A-4D jointly illustrate additional examples of implementing an electronic design with physical simulation using layout artwork using various techniques described herein in some embodiments.

FIGS. 4A-4D jointly illustrate additional examples of implementing an electronic design with physical simulation using layout artwork using various techniques described herein in some embodiments. More specifically, FIG. 4A illustrates a portion of a semiconductor chip 402A with an identified region 404A for more detailed analysis. A GDSII file for a microprocessor may be of the size of hundreds of gigabytes or even in the terabyte range so modeling and analyzing an entire microprocessor with GDSII data is impractical at best for even modern computing systems. 406A illustrates a zoom-in view 406A of the identified region 404A.

Figure 4B:
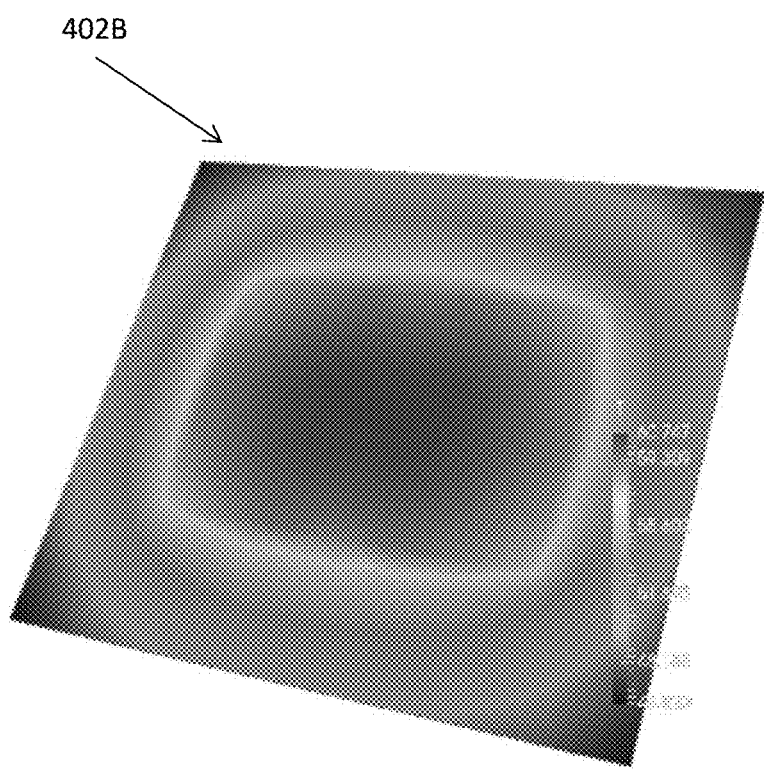
Figure 4C:
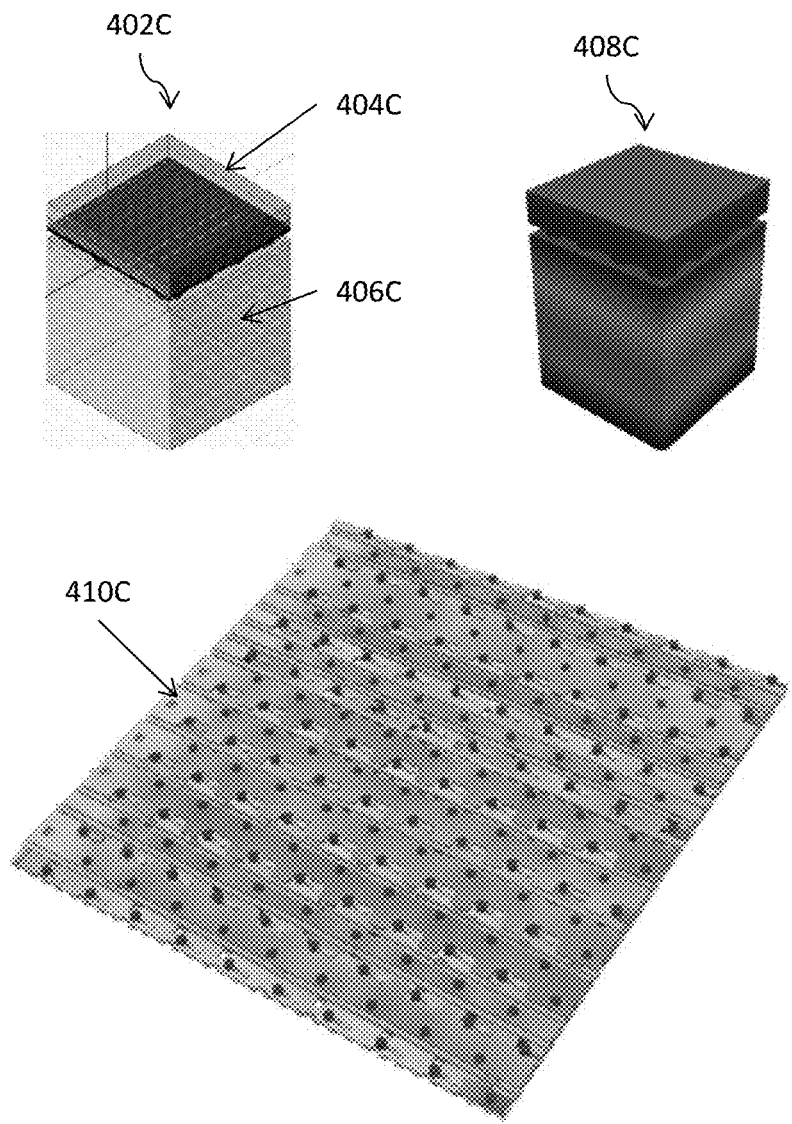

FIG. 4B illustrates the temperature profile 402B across the entire IC package on a PCB 402A that is modeled as a reduced 3D model using the techniques described herein. This reduced 3D model of the IC package on a PCB 402A is analyzed with physics-based techniques or methodologies. FIG. 4C illustrates the more detailed 3D model 402C of the identified region 404A. More specifically, this more detailed 3D model 402C includes a detailed 3D model for the IC package 404C for the semiconductor chip packaged therein (not shown) mounted on the PCB that is modeled as a reduced 3D model to conserve computational resources because of the relatively fewer PCB features that may impact the accuracy of the analysis results. Therefore, the 3D model 402C for the selected region 404A (in a 2D layout view) includes a detailed 3D model generated with the layout artwork (e.g., GDSII data) for the IC package and a reduced 3D model for the underlying PCB on which the IC package is mounted.

408C illustrates the temperature distribution overlaid on top of the 3D model 402C. 410C illustrates the temperature distribution across a layer in the semiconductor chip packaged in the IC package. As illustrated in 410C, this layer is modeled as a detailed 3D model with the corresponding layout artwork. This 3D model is further discretized into a plurality of meshes and nodes that the corresponding solutions thus provide much finer granularity level of details.

Figure 4D:
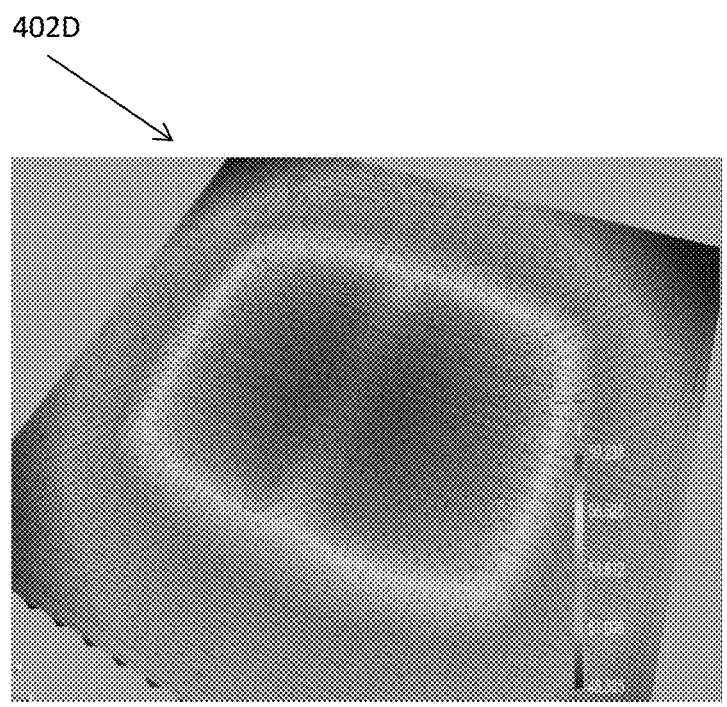

FIG. 4D illustrates the more detailed temperature distribution 402D across the entire IC package on a PCB after the detailed model 402C of the identified region 404A is analyzed. The results of the analyses of the detailed model 402C may be integrated with the results of the reduced model for the entire IC package on the PCB and stored in an indexed data structure for subsequent reuse. The results may be individually queried with reference to the discretized nodes and meshes to provide fine granularity resolution limited only by the discretization of the 3D models.

Figure 5A:
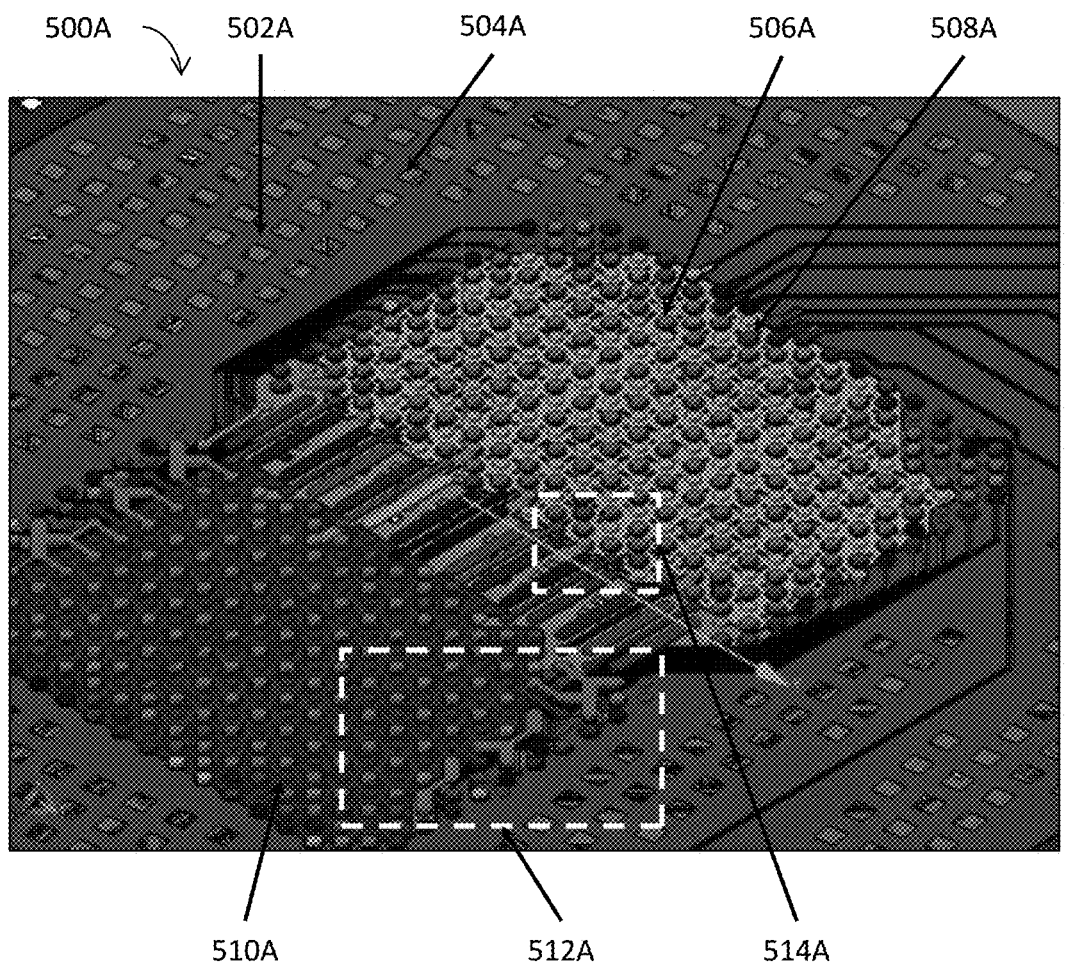
FIGS. 5A-5D jointly illustrate further examples of implementing an electronic design with physical simulation using layout artwork using various techniques described herein in some embodiments.

FIGS. 5A-5D jointly illustrate further examples of implementing an electronic design with physical simulation using layout artwork using various techniques described herein in some embodiments. FIG. 5A illustrates a 3D model 500A that is generated with the layout artwork for a portion of an electronic design using various techniques described herein. More specifically, this portion 500A includes, for example, a first metal layer 502A including a plurality of rectangular openings 504A. Underneath the first metal layer 502A lies the second metal layer (covered by the first metal layer and exposed only through the rectangular openings 504A).

The first cylindrical 3D structures 506A represent first interconnects (e.g., bumps) on a first layer; the second cylindrical 3D structures 508A represent second interconnects (e.g., bumps) on a second layer; and the third cylindrical 3D structures 510A represent interconnects (e.g., bumps) on a first layer. Windows 512A and 514A illustrates the corresponding portions in the 3D model 500A. More details about these two windows 512A and 514A will be described immediately below with reference to FIGS. 5B-5C.

Figure 5B:
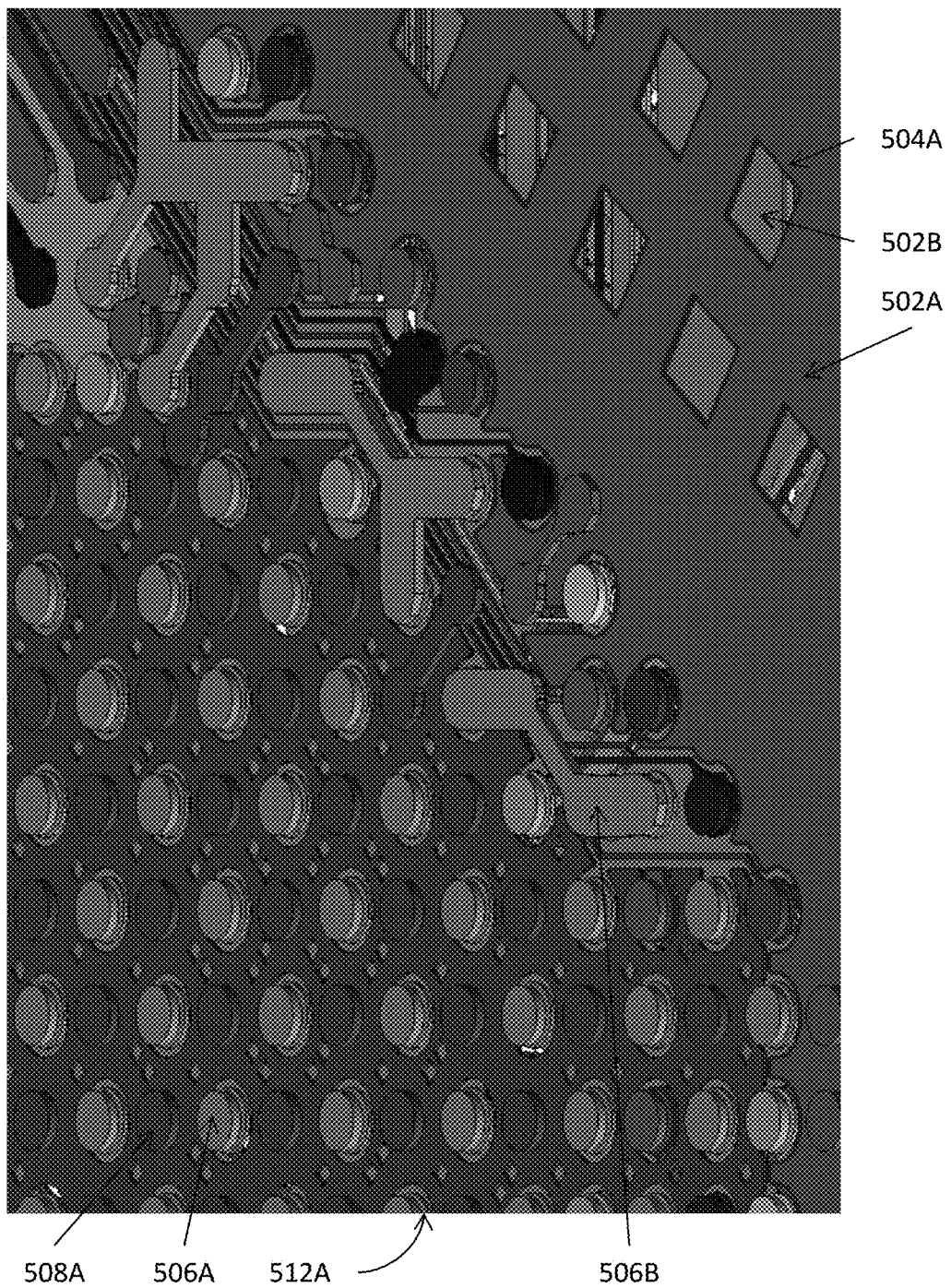

FIG. 5B illustrates a zoom-in view of the first window 512A illustrated in FIG. 5A. More specifically, FIG. 5B illustrates that the 3D model includes the first metal layer 502A, a plurality of rectangular openings 504A, and the underlying second metal layer 502B that may be observed through the rectangular openings 504A. FIG. 5B further illustrates that the 3D model includes the first interconnects 506A, the second interconnects 508A, and first pins 506B.

Figure 5C:
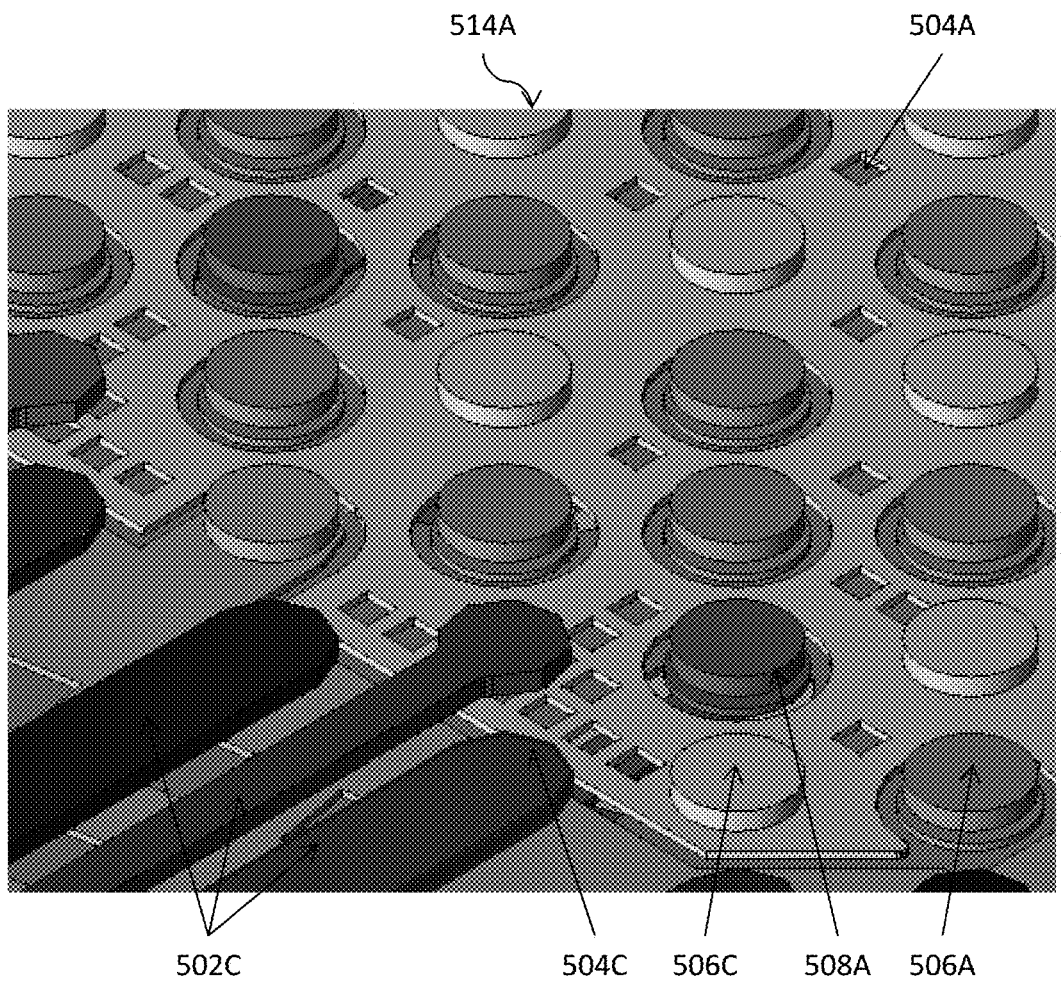

FIG. 5C illustrates another zoom in view of the second window 514A illustrated in FIG. 5A. More specifically, FIG. 5C illustrates that the 3D model includes the first interconnects 506A, the second interconnects 508A, the third interconnects 506C (e.g., bumps) on a third metal layer, and second pins 502C. Although the 3D model in FIGS. 5A-5D is generated using the layout artwork, FIG. 5C also illustrates the reduction or simplification of the layout artwork by approximating a circular end of a second pin 502C with a plurality of straight line segments 504C.

In some embodiments, the length of the line segments may be determined based in part upon one or more other geometric features and/or the discretization requirement. For example, the length of a line segment may be determined based in part upon the width and/or thickness of the second pin 502C, the size(s) of nearby geometric feature(s), etc. so that the 3D model can be subsequently discretized into meshes that will not significantly affect the numerical stability of subsequent analyses or will not significantly deteriorate the performance of the discretization and/or the analyses of the 3D model.

Meshes (e.g., hexahedron mesh having eight nodes, prism or wedge having six nodes, tetrahedron mesh with four nodes, pyramid mesh with five nodes, etc.), if not generated properly, can adversely affect the performance (e.g., convergence rate, consistency, etc.) or even the numerical stability. For example, a mesh having an angle that is smaller than a threshold value or having a disparity in the lengths of the edges (e.g., a ratio of the lengths of two edges) above another threshold value may adversely affect the performance and/or numerical stability of discretization and/or subsequent analyses. These techniques described herein accounts for the performance and numerical stability factors during the generation of a 3D model, discretizing the 3D model, and/or analyzing the 3D model to provide efficient yet accurate analysis results so as to avoid these potential issues and to avoid unnecessary waste of computational resources.

Figure 5D:
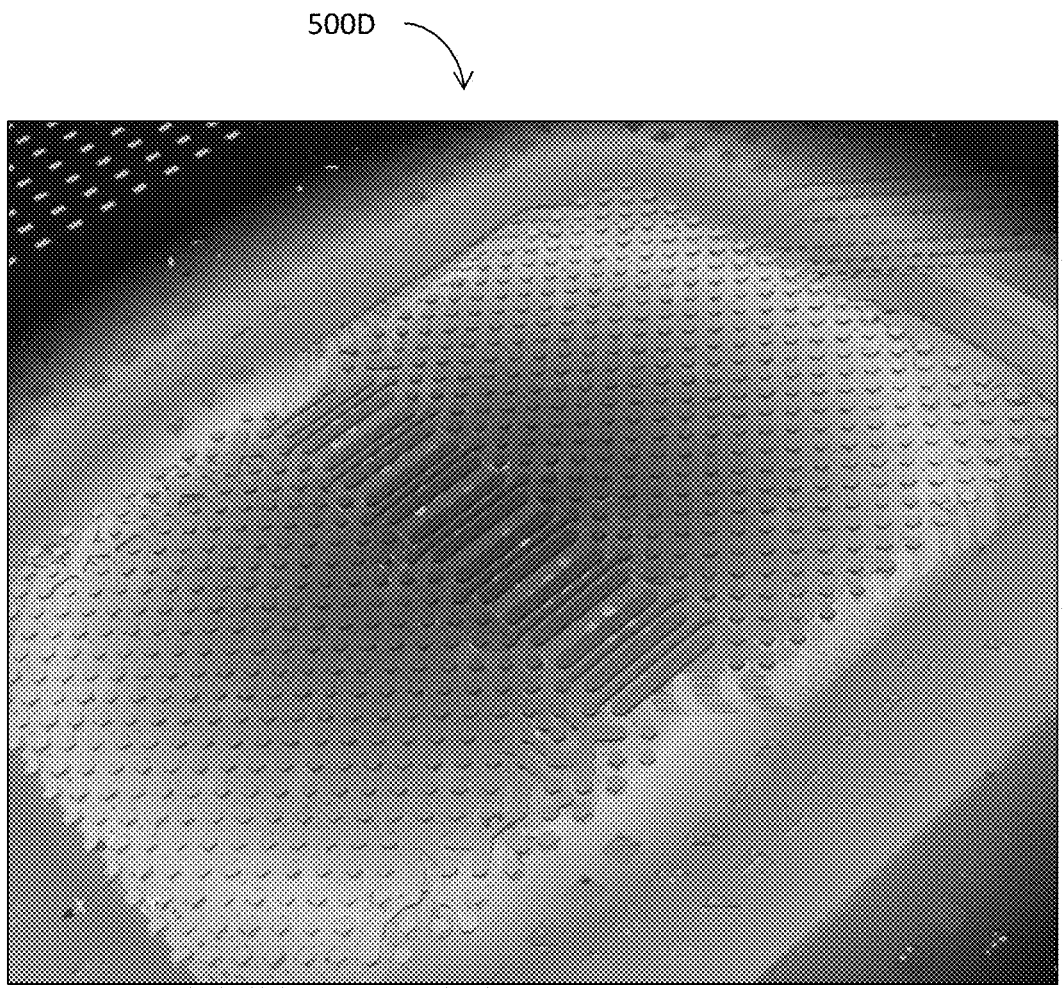

FIG. 5D illustrates the temperature distribution across the 3D model 500A after the model 500A is analyzed. The results of the analyses of the model 500A may be stored in an indexed data structure for subsequent reuse. The results may be individually queried with reference to the discretized nodes and meshes to provide fine granularity resolution limited only by the discretization of the 3D models.

System Architecture Overview

Figure 6:
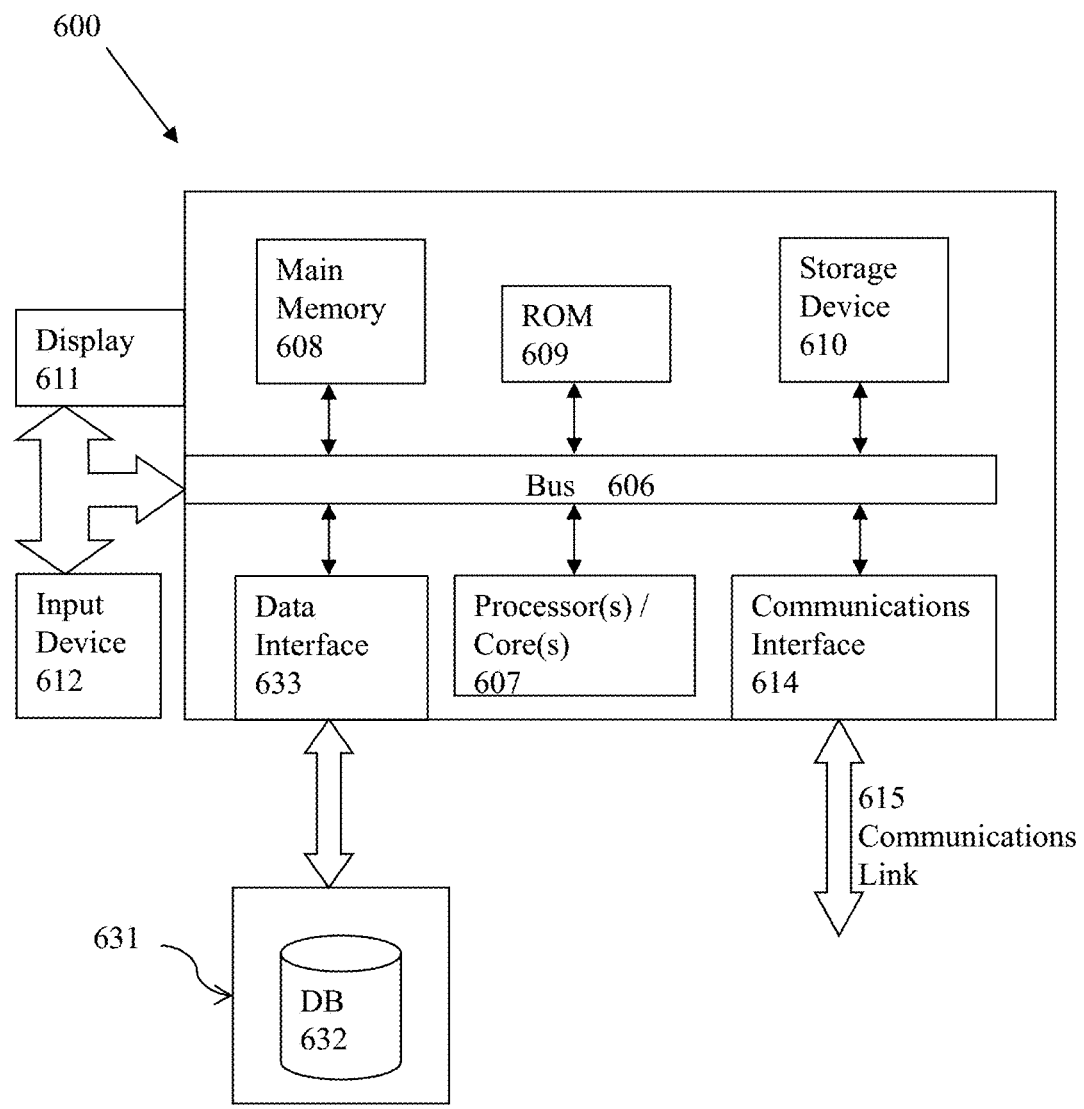
FIG. 6 illustrates a computerized system on which a process for implementing an electronic design with physical simulation using layout artwork may be implemented.

FIG. 6 illustrates a computerized system on which a process for implementing an electronic design with physical simulation using layout artwork may be implemented as described in the preceding paragraphs with reference to various figures. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown). The illustrative computing system 500 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 500 may include or may be a part of a cloud computing platform in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" and "module" shall mean any combination of software and/or hardware that is used to implement all or part of the invention. In these embodiments, to the extent a "module" or "logic" includes any software portion, at least a part of the software portion is stored in a non-transitory computer readable storage medium (e.g., random access memory or RAM) for execution by one or more processors or one or more processor cores.

Various actions or processes as described in the preceding paragraphs may be performed by using one or more processors, one or more processor cores, or combination thereof 607, where the one or more processors, one or more processor cores, or combination thereof executes one or more threads. For example, the act of extracting, the act of determining, the act of representing, the act of generating, the act of performing one or more analyses, etc. may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633.

A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing an electronic design with physical simulation using layout artwork, comprising:

determining, at one or more layout analysis modules including or functioning in conjunction with the at least one processor and at least partially stored in a non-transitory computer readable storage medium of a computing system, approximate behaviors of an electronic design using at least layout artwork, wherein the approximate behaviors comprise an electrical behavior and/or a thermal behavior of the electronic design;

identifying, at a user interface of the computing system, a region in the electronic design;

identifying or generating, at the one or more layout analysis modules, a first three-dimensional (3D) model for the region in the electronic design, wherein at least some design data in a child hierarchy located below a parent hierarchy in the region is ignored in constructing the 3D model, and the 3D model includes a characteristic corresponding to the at least some design data that has been ignored; and determining, at the one or more layout analysis modules, behaviors of the region using at least physics-based techniques that are preconditioned upon at least a portion of the approximate behaviors of the electronic design.

2. The computer implemented method of claim 1, further comprising:

reducing or eliminating, at the one or more layout analysis modules, mask manufacturing cycle time or mask manufacturing errors based in part or in whole upon the behaviors of the region, wherein the electronic design comprises at least one of a semiconductor chip, an integrated circuit (IC) package for the semiconductor chip, a printed circuit board having at least the IC package mounted thereupon, a computing system comprising the printed circuit board, a rack including the computing system and one or more additional computing systems, and a plurality of racks each including the computing system and the one or more additional computing systems.

3. The computer implemented method of claim 1, the act of determining the approximate behaviors comprising:
identifying, at the one or more layout analysis modules, a model generation module from a plurality of model generation modules each corresponding to a respectively granularity or resolution level of details; and
determining, at the one or more layout analysis modules, at least one pertinent portion of the layout artwork for generating a reduced 3D model for the electronic design.

4. The computer implemented method of claim 3, the act of determining the approximate behaviors comprising:
identifying, at the one or more layout analysis modules, geometric data from the layout artwork or one or more technology files;
identifying, at the one or more layout analysis modules, one or more properties of one or more materials that are used for one or more circuit components in the electronic design; and
generating, at the one or more layout analysis modules, the reduced 3D model for the electronic design using at least the model generation module with the geometric data from the layout artwork or the one or more technology files.

5. The computer implemented method of claim 4, further comprising:
identifying a custom selection of one or more circuit features, components, or devices or identifying one or more granularity or resolution levels.

6. The computer implemented method of claim 4, the act of generating the reduced 3D model for the electronic design comprising:
identifying a granularity or resolution level or a first hierarchical level in the electronic design for the reduced 3D model for the electronic design;
identifying, at the one or more layout analysis modules, a plurality of first geometric characteristics of the electronic design based at the granularity or resolution level or the first hierarchical level; and
determining, at the one or more layout analysis modules, the reduced 3D model for the electronic design using at least the plurality of first geometric characteristics.

7. The computer implemented method of claim 4, the act of generating the reduced 3D model for the electronic design comprising:
identifying, at the one or more layout analysis modules, one or more material properties for one or more first circuit features, circuit components, or devices in one or more lower hierarchical levels below the first hierarchical level or the granularity or resolution level;
identifying, at the one or more layout analysis modules, a plurality of second geometric characteristics for the one or more first circuit features, circuit components, or devices in the one or more lower hierarchical levels below the first hierarchical level or the granularity or resolution level; and
distributing, at the one or more layout analysis modules, the one or more material properties in or on the reduced 3D model based at least in part upon the plurality of second geometric characteristics.

8. The computer implemented method of claim 1, the act of identifying the region in the electronic design comprising:

identifying the region from a design window presenting at least the region of the electronic design in a user interface or from a tree structure presenting a list of circuit component designs in the electronic design in the user interface; and
performing, at the one or more layout analysis modules, one or more acts, the one or more acts comprising:
determining availability or presence of one or more other 3D models for one or more portions in the electronic design; or
adjusting the region into a first adjusted region based at least in part upon the availability or the presence of the one or more other 3D models and a proximity requirement in relation to the region.

9. The computer implemented method of claim 8, the one or more acts further comprising:
identifying one or more model characteristics of the one or more other 3D models; or
adjusting the region or the first adjusted region into a second adjusted region based in part or in whole upon one or more first criteria, the one or more criteria comprising the one or more model characteristics of the one or more other 3D models, an analysis stability requirement, or a performance requirement.

10. The computer implemented method of claim 9, the one or more acts further comprising:
simplifying or reducing the layout artwork based at least in part upon one or more second criteria, the one or more second criteria comprising one or more predetermined thresholds, the analysis stability requirement, the performance requirement, or computational resource utilization information;
identifying or predicting one or more processing bottlenecks; or
in response to an identification or a prediction of a processing bottleneck, reducing or eliminating the processing bottleneck at least by altering a processing requirement based at least in part upon criticality of one or more circuit portions corresponding to the processing bottleneck.

11. The computer implemented method of claim 1, the act of identifying or generating the first 3D model for the region comprising:
determining, at the one or more layout analysis modules, whether the electronic design corresponds to one or more existing 3D models;
in response to results of determining whether the electronic design corresponds to the one or more existing 3D models, identifying an existing 3D model from the one or more existing 3D models;
incorporating, at the one or more layout analysis modules, the existing 3D model into the first 3D model based in part or in whole upon a relative position of the existing 3D model relative to the region; and
determining a final size, shape, or location of the region based at least in part upon boundaries of the existing 3D model.

12. The computer implemented method of claim 1, the act of identifying or generating the first 3D model for the region comprising:
identifying, at the one or more layout analysis modules, one- or two-dimensional shape data from the layout artwork or one or more corresponding technology files for a 3D object in the region; and
generating, at the one or more layout analysis modules, the 3D object using at least the one- or two-dimensional shape data for the 3D object in the first 3D model.

13. The computer implemented method of claim 12, the act of identifying or generating the first 3D model for the region comprising:
- identifying, at the one or more layout analysis modules, one or more properties of one or more materials used for circuit components in the region of the electronic design;
- associating, at the one or more layout analysis modules, the one or more properties with the 3D object in the first 3D model for the region; and
- discretizing, at the one or more layout analysis modules, the first 3D model into a discretized 3D model based at least in part upon one or more first factors, the one or more first factors comprising a performance requirement, an accuracy requirement, a sliding balance requirement between performance and accuracy, or one or more first model characteristics of one or more existing 3D models for the electronic design.

14. The computer implemented method of claim 1, the act of determining the behaviors of the region comprising:
- identifying, at the one or more layout analysis modules, corresponding approximate behaviors for the region or a portion of the region from the approximate behaviors of the electronic design;
- transforming, at the one or more layout analysis modules, the corresponding approximate behaviors into corresponding constraints or conditions for the first 3D model;
- imposing, at the one or more layout analysis modules, the corresponding constraints or conditions on one or more corresponding portions of the first 3D model using at least one or more indexed data structures; and
- generating, at the one or more layout analysis modules, analysis results for the first 3D model at least by determining the behaviors of the region with the corresponding constraints or conditions with the one or more physics-based techniques or methodologies.

15. The computer implemented method of claim 14, the act of determining the behaviors of the region further comprising:
- presenting the analysis results with graphical or textual emphasis on and one or more links to abnormal behaviors in the behaviors and one or more corresponding circuit portions in the region in the user interface;
- implementing one or more modifications in the one or more corresponding circuit portions in the region based at least in part upon the abnormal behaviors; and
- re-validating, at the one or more layout analysis modules, the behaviors of at least the one or more corresponding circuit portions.

16. The computer implemented method of claim 15, the act of determining the behaviors of the region further comprising:
- re-using, at the one or more layout analysis modules, at least a part of the analysis results in an area of the electronic design, wherein the area of the electronic design is outside of a range of influence of the abnormal behaviors; and
- updating, at the one or more layout analysis modules, one or more indices of the one or more indexed data structures based at least in part upon information about the one or more modifications.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing an electronic design with physical simulation using layout artwork, the set of acts comprising:
- determining, at one or more layout analysis modules including or functioning in conjunction with the at least one processor and at least partially stored in a non-transitory computer readable storage medium of a computing system, approximate behaviors of an electronic design using at least layout artwork, wherein
  - the approximate behaviors comprise an electrical behavior and/or a thermal behavior of the electronic design;
- identifying, at a user interface of the computing system, a region in the electronic design;
- identifying or generating, at the one or more layout analysis modules, a first three-dimensional (3D) model for the region in the electronic design, wherein
  - at least some design data in a child hierarchy located below a parent hierarchy in the region is ignored in constructing the 3D model, and
  - the 3D model includes a characteristic corresponding to the at least some design data that has been ignored; and
- determining, at the one or more layout analysis modules, behaviors of the region using at least one or more physics-based techniques or methodologies that are preconditioned upon at least a portion of the approximate behaviors of the electronic design.

18. The article of manufacture of claim 17, the set of acts further comprising:
- reducing or eliminating, at the one or more layout analysis modules, mask manufacturing cycle time or mask manufacturing errors based in part or in whole upon the behaviors of the region, wherein the electronic design comprises at least one of a semiconductor chip, an integrated circuit (IC) package for the semiconductor chip, a printed circuit board having at least the IC package mounted thereupon, a computing system comprising the printed circuit board, a rack including the computing system and one or more additional computing systems, and a plurality of racks each including the computing system and the one or more additional computing systems.

19. A system for implementing an electronic design with physical simulation using layout artwork, comprising:
- non-transitory computer accessible storage medium storing thereupon program code; and
- one or more layout analysis modules that function in conjunction with the at least one microprocessor and at least partially stored in a non-transitory computer readable storage medium of a computing system and are configured to execute the program code to determine approximate behaviors of an electronic design using at least layout artwork, wherein
  - the approximate behaviors comprise an electrical behavior and/or a thermal behavior of the electronic design;
- at least one microprocessor configured to execute the program code at least to identifying, at a user interface of the computing system, a region in the electronic design;
- the one or more layout analysis modules further configured to identify or generate a first three-dimensional (3D) model for the region in the electronic design, wherein at least some design data in a child hierarchy located below a parent hierarchy in the region is ignored in constructing the 3D model, and the 3D model includes a characteristic corresponding to the at least some design data that has been ignored; and the one or more layout analysis modules further configured to determine behaviors of the region using at least one or more physics-based techniques or methodologies that are preconditioned upon at least a portion of the approximate behaviors of the electronic design.

20. The system for claim 19, the one or more layout analysis modules further configured to reduce or eliminate mask manufacturing cycle time or mask manufacturing errors based in part or in whole upon the behaviors of the region, wherein the electronic design comprises at least one of a semiconductor chip, an integrated circuit (IC) package for the semiconductor chip, a printed circuit board having at least the IC package mounted thereupon, a computing system comprising the printed circuit board, a rack including the computing system and one or more additional computing systems, and a plurality of racks each including the computing system and the one or more additional computing systems.

* * * * *